United States Patent
Regunathan et al.

(10) Patent No.: US 8,116,380 B2
(45) Date of Patent: Feb. 14, 2012

(54) SIGNALING FOR FIELD ORDERING AND FIELD/FRAME DISPLAY REPETITION

(75) Inventors: Shankar Regunathan, Bellevue, WA (US); Chih-Lung Lin, Redmond, WA (US); Thomas W. Holcomb, Bothell, WA (US); Kunal Mukerjee, Redmond, WA (US); Pohsiang Hsu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 775 days.

(21) Appl. No.: 10/934,117

(22) Filed: Sep. 4, 2004

(65) Prior Publication Data

US 2005/0083218 A1    Apr. 21, 2005

Related U.S. Application Data

(60) Provisional application No. 60/501,081, filed on Sep. 7, 2003.

(51) Int. Cl.
*H04N 7/12* (2006.01)
*H04N 11/02* (2006.01)
*H04N 11/04* (2006.01)

(52) U.S. Cl. .......... 375/240.25; 375/240.12; 375/240.26

(58) Field of Classification Search ............. 375/240.26, 375/240.12
See application file for complete search history.

(56) References Cited

U.S. PATENT DOCUMENTS

| | | | |
|---|---|---|---|
| 4,706,260 A | 11/1987 | Fedele et al. | |
| 4,849,812 A | 7/1989 | Borgers et al. | |
| 4,954,892 A | 9/1990 | Asai et al. | |
| 5,027,206 A | 6/1991 | Vreeswijk et al. | |
| 5,091,782 A | 2/1992 | Krause et al. | |
| 5,175,618 A | 12/1992 | Ueda et al. | |
| 5,191,436 A | 3/1993 | Yonemitsu | |
| 5,212,549 A | 5/1993 | Ng et al. | |
| 5,223,949 A | 6/1993 | Honjo | |
| 5,235,618 A | 8/1993 | Sakai et al. | |
| 5,291,486 A | 3/1994 | Koyanagi | |

(Continued)

FOREIGN PATENT DOCUMENTS

EP    0599529    6/1994

(Continued)

OTHER PUBLICATIONS

Microsoft Corporation, "Microsoft Debuts New Windows Media Player 9 Series, Redefining Digital Media on the PC," 4 pp. (Sep. 4, 2002) [Downloaded from the World Wide Web on May 14, 2004].

(Continued)

*Primary Examiner* — Jayanti K. Patel
*Assistant Examiner* — Jessica Prince
(74) *Attorney, Agent, or Firm* — Klarquist Sparkman, LLP

(57) ABSTRACT

A decoder processes a first bitstream element (e.g., a pull-down flag) in a first syntax layer (e.g., sequence layer or entry point layer) above frame layer in a bitstream for a video sequence, the bitstream comprising encoded source video having a source type (e.g., progressive or interlace). The decoder processes frame data in a second syntax layer (e.g., frame layer) of the bitstream for a frame (such as an interlaced frame or progressive frame, depending on source type, or a skipped frame) in the video sequence. The first bitstream element indicates whether a repeat-picture element (e.g., a repeat-frame element or a repeat field-element) is present or absent in the frame data in the second syntax layer.

22 Claims, 15 Drawing Sheets

Software 280 implementing video encoder or decoder implementing described techniques and tools

U.S. PATENT DOCUMENTS

| | | | |
|---|---|---|---|
| 5,301,242 A | 4/1994 | Gonzales et al. | |
| 5,343,248 A | 8/1994 | Fujinami | |
| 5,365,552 A | 11/1994 | Astle | |
| 5,422,676 A | 6/1995 | Herpel et al. | |
| 5,426,464 A | 6/1995 | Casavant et al. | |
| 5,461,420 A | 10/1995 | Yonemitsu et al. | |
| 5,491,516 A | 2/1996 | Casavant et al. | |
| 5,510,840 A | 4/1996 | Yonemitsu et al. | |
| 5,539,466 A | 7/1996 | Igarashi et al. | |
| 5,541,852 A | 7/1996 | Eyuboglu et al. | |
| 5,543,847 A | 8/1996 | Kato | |
| 5,566,208 A | 10/1996 | Balakrishnan | |
| 5,600,376 A | 2/1997 | Casavant et al. | |
| 5,606,539 A | 2/1997 | De Haan et al. | |
| 5,608,697 A | 3/1997 | De Haan et al. | |
| 5,691,771 A | 11/1997 | Oishi et al. | |
| 5,699,476 A | 12/1997 | Van Der Meer | |
| 5,740,310 A | 4/1998 | De Haan et al. | |
| 5,784,107 A | 7/1998 | Takahashi | |
| RE36,015 E | 12/1998 | Iu | |
| 5,844,867 A | 12/1998 | De Haan et al. | |
| 5,874,995 A | 2/1999 | Naimpally et al. | |
| 5,933,451 A | 8/1999 | Ozkan et al. | |
| 5,946,043 A | 8/1999 | Lee et al. | |
| 5,952,943 A | 9/1999 | Walsh et al. | |
| 5,970,173 A | 10/1999 | Lee et al. | |
| RE36,507 E | 1/2000 | Iu | |
| 6,060,997 A | 5/2000 | Taubenheim et al. | |
| 6,088,063 A | 7/2000 | Shiba | |
| 6,101,195 A | 8/2000 | Lyons et al. | |
| 6,141,053 A | 10/2000 | Saukkonen | |
| 6,160,849 A | 12/2000 | Igarashi et al. | |
| 6,198,773 B1* | 3/2001 | Gill et al. | 375/240.26 |
| 6,233,226 B1 | 5/2001 | Gringeri et al. | |
| RE37,222 E | 6/2001 | Yonemitsu et al. | |
| 6,295,321 B1 | 9/2001 | Lyu | |
| 6,324,216 B1 | 11/2001 | Igarashi et al. | |
| 6,370,276 B2 | 4/2002 | Boon | |
| 6,408,096 B2 | 6/2002 | Tan | |
| 6,441,813 B1 | 8/2002 | Ishibashi | |
| 6,459,811 B1 | 10/2002 | Hurst, Jr. | |
| 6,499,060 B1 | 12/2002 | Wang et al. | |
| 6,556,627 B2* | 4/2003 | Kitamura et al. | 375/240.26 |
| 6,593,392 B2 | 7/2003 | Wang et al. | |
| 6,654,420 B1 | 11/2003 | Snook | |
| 6,671,323 B1* | 12/2003 | Tahara et al. | 375/240.26 |
| 6,728,317 B1 | 4/2004 | Demos | |
| 6,775,840 B1 | 8/2004 | Naegel et al. | |
| 6,792,048 B1 | 9/2004 | Lee et al. | |
| 6,842,485 B2 | 1/2005 | Monda et al. | |
| 6,873,629 B2 | 3/2005 | Morris | |
| 7,010,046 B2 | 3/2006 | Trevers et al. | |
| 7,064,790 B1* | 6/2006 | Varma et al. | 348/441 |
| 7,227,895 B1 | 6/2007 | Wang et al. | |
| 7,298,303 B2* | 11/2007 | Kobayashi et al. | 341/107 |
| 7,609,762 B2 | 10/2009 | Crinon et al. | |
| 2001/0010708 A1* | 8/2001 | Nakazawa | 375/240.25 |
| 2001/0055469 A1 | 12/2001 | Shida et al. | |
| 2002/0001348 A1* | 1/2002 | Yiwen et al. | 375/240.26 |
| 2002/0012394 A1 | 1/2002 | Hatano et al. | |
| 2002/0061067 A1 | 5/2002 | Lyons et al. | |
| 2002/0061073 A1 | 5/2002 | Huang et al. | |
| 2002/0080875 A1 | 6/2002 | Tahara et al. | |
| 2002/0191712 A1 | 12/2002 | Gaddam et al. | |
| 2002/0196857 A1* | 12/2002 | Kono et al. | 375/240.25 |
| 2003/0053416 A1 | 3/2003 | Ribas-Corbera et al. | |
| 2003/0113026 A1 | 6/2003 | Srinivasan et al. | |
| 2003/0137600 A1* | 7/2003 | Chen et al. | 348/446 |
| 2003/0185298 A1 | 10/2003 | Alvarez et al. | |
| 2003/0202590 A1 | 10/2003 | Gu et al. | |
| 2003/0231593 A1 | 12/2003 | Bauman et al. | |
| 2004/0042673 A1 | 3/2004 | Boon | |
| 2004/0130619 A1* | 7/2004 | Lin | 348/96 |
| 2004/0142699 A1 | 7/2004 | Jollota et al. | |
| 2004/0255063 A1 | 12/2004 | Crinon et al. | |
| 2005/0074061 A1 | 4/2005 | Ribas-Corbera et al. | |
| 2005/0200758 A1 | 9/2005 | Monahan et al. | |
| 2006/0013568 A1 | 1/2006 | Rodriguez | |
| 2006/0143678 A1 | 6/2006 | Chou et al. | |
| 2007/0153918 A1* | 7/2007 | Rodriguez | 375/240.29 |

FOREIGN PATENT DOCUMENTS

| | | |
|---|---|---|
| EP | 0 852 445 | 8/1998 |
| JP | 62032725 | 2/1987 |
| JP | 1049388 | 2/1989 |
| JP | 4207684 | 7/1992 |
| JP | 04-297179 | 10/1992 |
| JP | 5236457 | 9/1993 |
| JP | 6030394 | 2/1994 |
| JP | 08-223385 | 8/1996 |
| JP | 09-261266 | 10/1997 |
| JP | 10-294757 | 11/1998 |
| JP | 2000165866 | 6/2000 |
| JP | 2000-286865 | 10/2000 |
| JP | 2001-109686 | 4/2001 |
| JP | 2001-169261 | 6/2001 |
| KR | 10-2001-39215 | 5/2001 |
| WO | WO 00/30356 | 5/2000 |

OTHER PUBLICATIONS

Mook, "Next-Gen Windows Media Player Leaks to the Web," *BetaNews*, 17 pp. (Jul. 19, 2002) [Downloaded from the World Wide Web on Aug. 8, 2003].

ITU-T, "ITU-T Recommendation H.261: Video Codec for Audiovisual Services at p×64 kbits," 28 pp. (1993).

ITU-T, "ITU-T Recommendation H.262: Information Technology—Generic Coding of Moving Pictures and Associated Audio Information: Video1," 218 pp. (1995).

ITU-T, "ITU-T Recommendation H.263: Video Coding for Low Bit Rate Communication," 167 pp. (1998).

ISO/IEC, "ISO/IEC 11172-2: Information Technology—Coding of Moving Pictures and Associated Audio for Storage Media at up to About 1,5 Mbit/s," 122 pp. (1993).

ISO/IEC, "Information Technology—Coding of Audio-Visual Objects: Visual, ISO/IEC 14496-2, Committee Draft," 330 pp. (1998).

Joint Video Team of ISO/IEC MPEG and ITU-T VCEG, "Final Joint Committee Draft of Joint Video Specification (ITU-T Recommendation H.264, ISO/IEC 14496-10 AVC," 206 pp. (Aug. 2002).

U.S. Appl. No. 60/341,674, filed Dec. 17, 2001, Lee et al.

U.S. Appl. No. 60/488,710, filed Jul. 18, 2003, Srinivasan et al.

U.S. Appl. No. 60/501,081, filed Sep. 7, 2003, Srinivasan et al.

Borgwardt, "Core Experiment on Interlaced Video Coding," ITU Study Group 16 Question 16, VCEG-N85, 10 pp. (Oct. 2001).

U.S. Appl. No. 60/501,133, filed Sep. 7, 2003, Holcomb et al.

Chen et al., "Source Model for Transform Video Coder and Its Application—Part II: Variable Frame Rate Coding," *IEEE Transactions on Circuits and Systems for Video Technology*, vol. 7, No. 2, pp. 299-311 (Apr. 1997).

Hsu et al., "Joint Selection of Source and Channel Rate for VBR Video Transmission Under ATM Policing Constraints," *IEEE Journal on Selected Areas in Communication*, vol. 15, No. 6, pp. 1016-1028 (Aug. 1997).

ISO/IEC 13818-1, "MPEG-2 Systems—Coding of Moving Pictures and Associated Audio," 129 pp. (Mar. 1994).

ISO/IEC 13818-1, "MPEG-2 Systems—Coding of Moving Pictures and Associated Audio," second edition, 171 pp. (Dec. 2000).

ISO/IEC JVT-D131, "HRD and Related Issues," 5 pp. (Jul. 2002).

ISO/IEC JVT-G050r1 (Draft ITU-T Rec. H.264), "Joint Video Specification," 268 pp. (May 2003).

ISO/IEC JVT-E133, "Time—Shift Causality Constraint on the CAT-LB HRD," 8 pp. (Oct. 2002).

ITU-T Recommendation H.263, "Draft H.263," International Telecommunication Union, pp. 5, 46, 47 (Jan. 1998).

ITU-Telecommunications Standardization Sector, VCEG-N58, "A Generalized Hypothetical Reference Decoder for H.26L," 14 pp. (Sep. 2001).

Jenkac et al., "On Video Streaming over Variable Bit-rate and Wireless Channels," presented at Packet Video 2003, 11 pp. (Apr. 28-29, 2003).

Joint Video Team of ISO/IEC MPEG and ITU-T VCEG, "Final Joint Committee Draft of Joint Video Specification (ITU-T Recommendation H.264, ISO/IEC 14496-10 AVC)," 206 pp. (Aug. 2002).

Joint Video Team (JVT) of ISO/IEC MPEG & ITU-T VCEG, ISO/IEC JVT-E075, "HRD Clean-up," 7 pp. (Oct. 2002).

Pao et al., "Encoding Stored Video for Streaming Applications," *IEEE Transactions on Circuits and Systems for Video Technology*, vol. 11, No. 2, pp. 199-209 (Feb. 2001).

Reed et al., "Constrained Bit-Rate Control for Very Low Bit-Rate Streaming-Video Applications," *IEEE Transactions on Circuits and Systems for Video Technology*, vol. 11, No. 7, pp. 882-889 (Jul. 2001).

Reibman et al., "Constraints on Variable Bit-Rate Video for ATM Networks," *IEEE Transactions on Circuits and Systems for Video Technology*, vol. 2, No. 4, pp. 361-372 (Dec. 1992).

Ribas-Corbera et al., A Generalized Hypothetical Reference Decoder for H.26L (proposal) ITU Study Group 16 Question 6 (Q.6/SG16), VCEG, VCEG-N58, 14th Meeting, Santa Barbara, CA, Sep. 2001.

Ribas-Corbera et al., "A Generalized Hypothetical Reference Decoder for H.264/AVC," *IEEE Transactions on Circuits and Systems for Video Technology*, vol. 13, No. 7, 14 pp. (Jul. 2003).

Sheu et al., "A Buffer Allocation Mechanism for VBR Video Playback," Communication Tech. Proc. 2000, WCC-ICCT 2000, vol. 2, pp. 1641-1644 (Aug. 2000).

SMPTE, "Proposed SMPTE Standard for Television: VC-9 Compressed Video Bitstream Format and Decoding Process," Working Draft 2 (Oct. 2003).

Walpole et al., "A Player for Adaptive MPEG Video Streaming over the Internet," *Proc. SPIE*, vol. 3240, pp. 270-281 (Mar. 1998).

Wang et al., "Research on HDTV decoder synchronization system," *IEEE*, pp. 868-870 (Dec. 2000).

\* cited by examiner

Figure 1, prior art
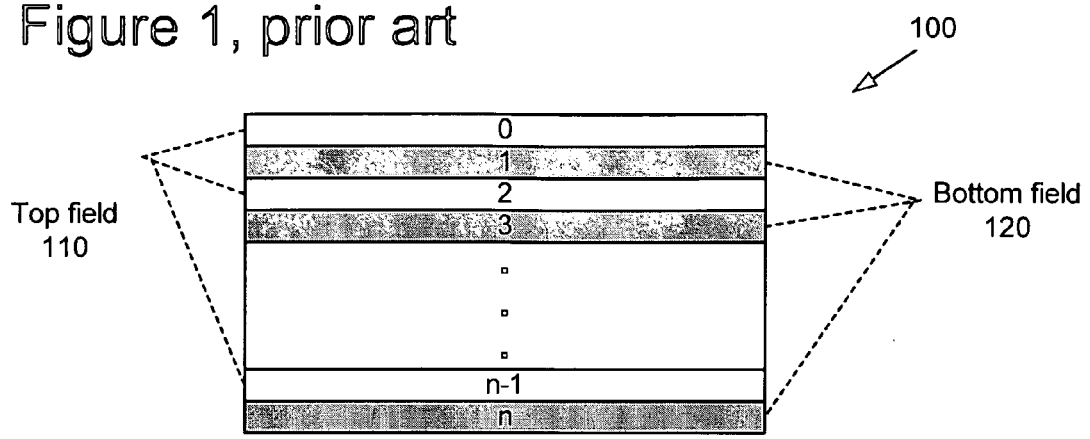
Figure 2
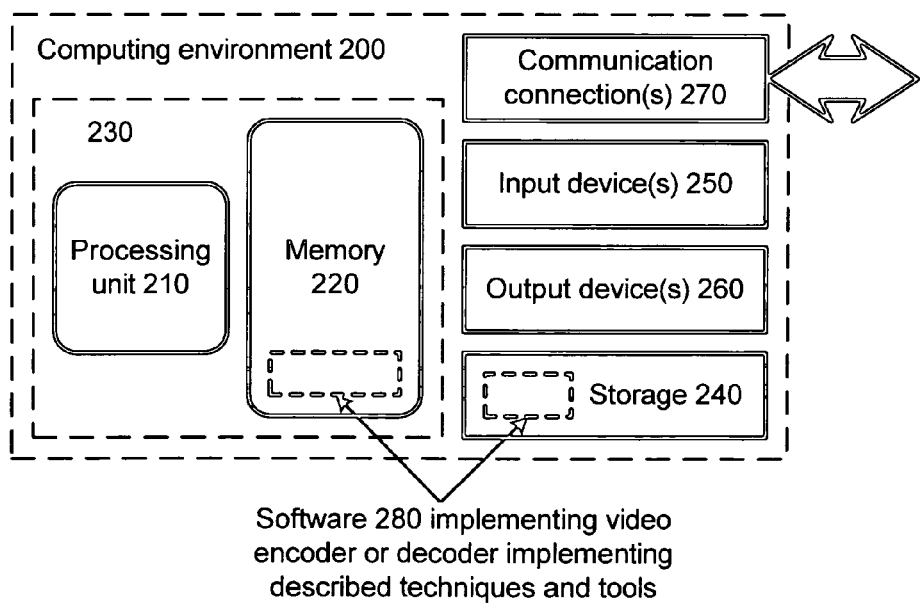
Software 280 implementing video encoder or decoder implementing described techniques and tools Top field
Bottom field Top field
Bottom field Top field
Bottom field

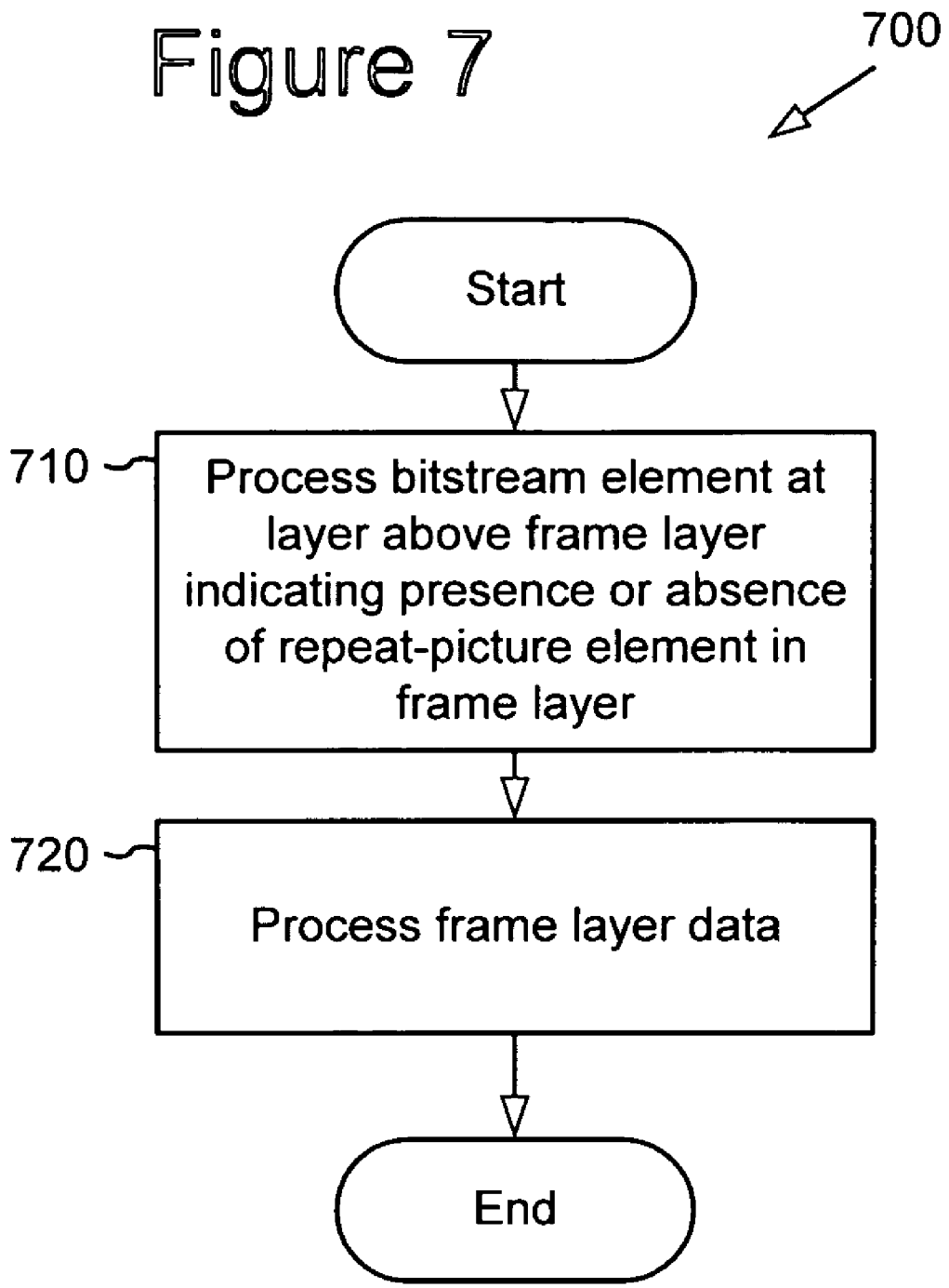

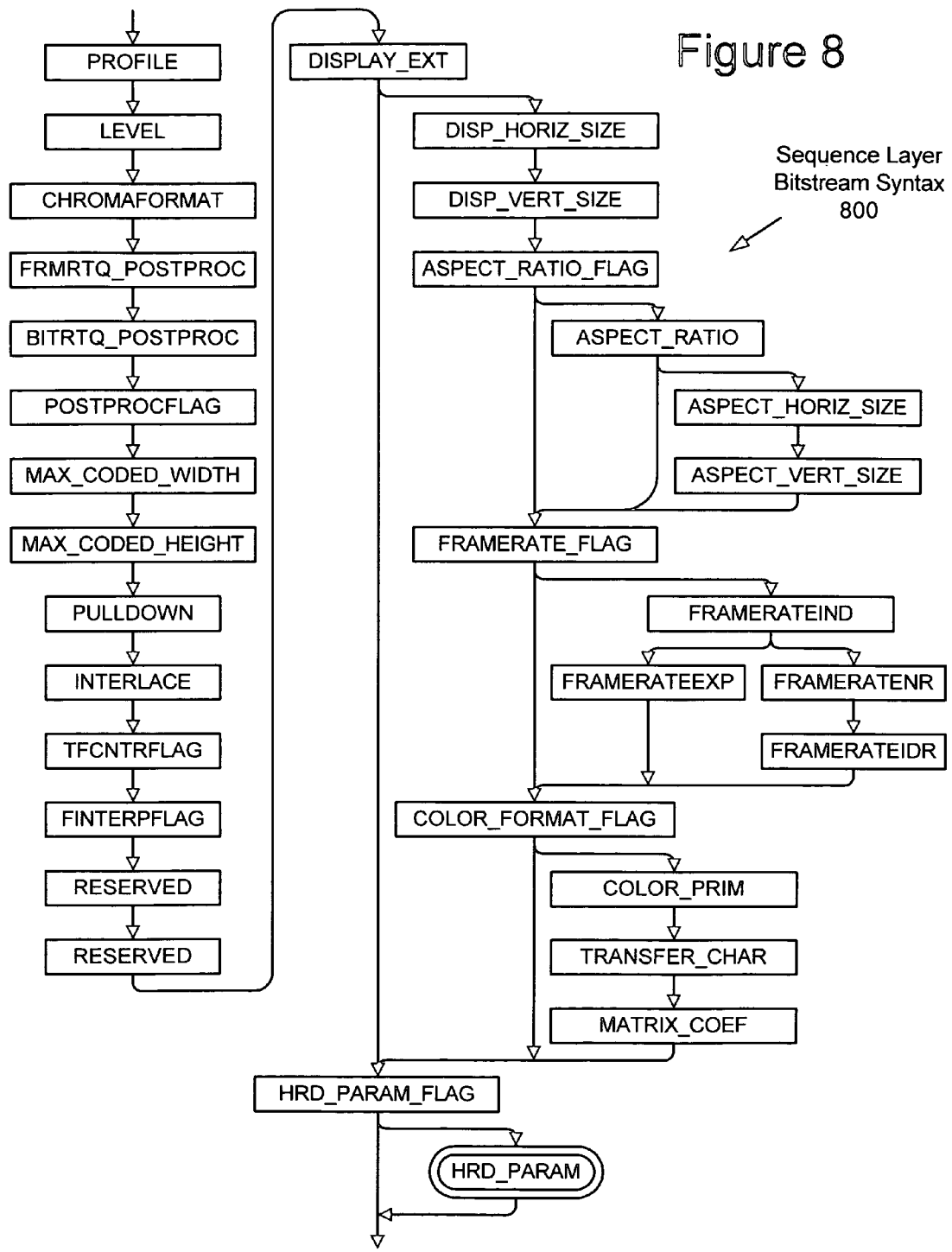

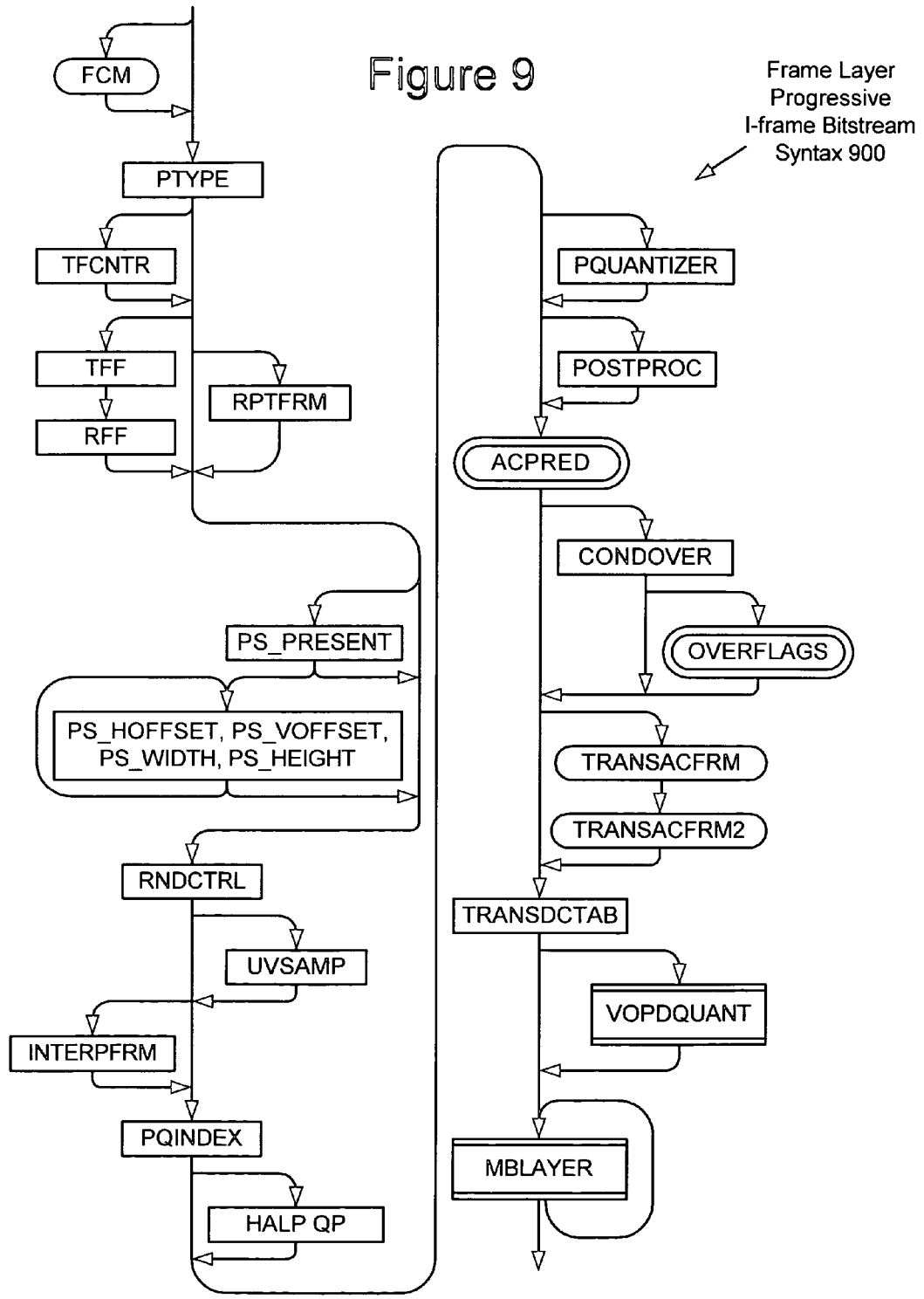

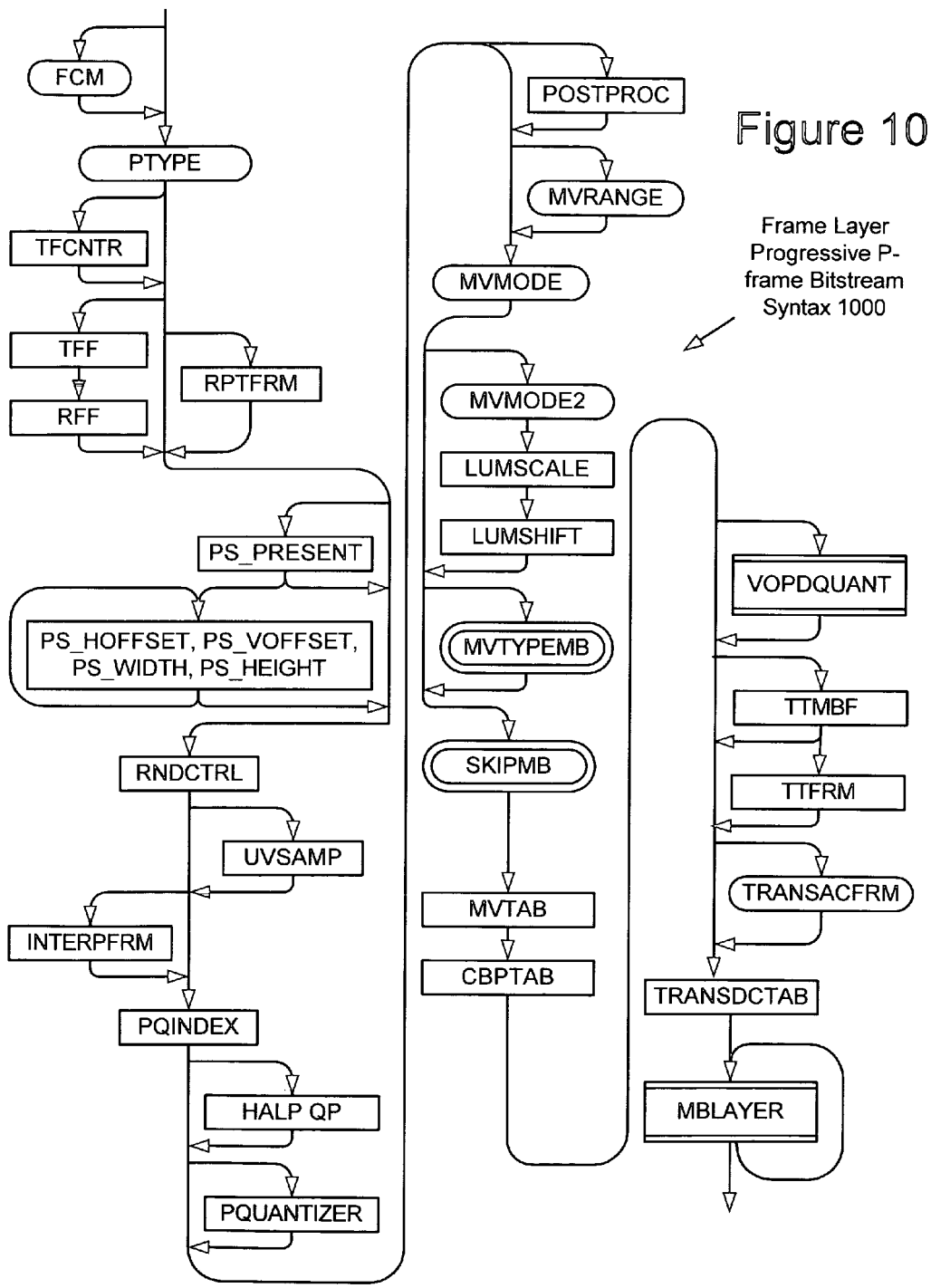

Frame Layer Progressive B-frame Bitstream Syntax 1100

Frame Layer Interlace P-frame Bitstream Syntax 1500

Frame Layer Interlace B-frame Bitstream Syntax 1600

```
If (INTERLACE == 1)
{
   If (PULLDOWN == 1)
   {
      NumberOfPanScanWindows = 2 + RFF
   }
   else
   {
      NumberOfPanScanWindows = 2
   }
}
else
{
   If (PULLDOWN == 1)
   {
      NumberOfPanScanWindows = 1 + RPTFRM
   }
   else
   {
      NumberOfPanScanWindows = 1
   }
}
```

SIGNALING FOR FIELD ORDERING AND FIELD/FRAME DISPLAY REPETITION

RELATED APPLICATION INFORMATION

This application claims the benefit of U.S. Provisional Patent Application No. 60/501,081, entitled "Video Encoding and Decoding Tools and Techniques," filed Sep. 7, 2003, which is hereby incorporated by reference.

TECHNICAL FIELD

Techniques and tools for progressive and interlaced video coding and decoding are described. For example, techniques and tools are for improved signaling for field ordering and display repetition.

BACKGROUND

Digital video consumes large amounts of storage and transmission capacity. A typical raw digital video sequence includes 15 or 30 pictures per second. Each picture can include tens or hundreds of thousands of pixels (also called pels). Each pixel represents a tiny element of the picture. In raw form, a computer commonly represents a pixel with 24 bits or more. Thus, the number of bits per second, or bit rate, of a typical raw digital video sequence can be 5 million bits/second or more.

Most computers and computer networks lack the resources to process raw digital video. For this reason, engineers use compression (also called coding or encoding) to reduce the bit rate of digital video. Compression can be lossless, in which quality of the video does not suffer but decreases in bit rate are limited by the complexity of the video. Or, compression can be lossy, in which quality of the video suffers but decreases in bit rate are more dramatic. Decompression reverses compression.

In general, video compression techniques include "intra" compression and "inter" or predictive compression. Intra compression techniques compress individual pictures, typically called I-frames or key frames for progressive video frames. Inter compression techniques compress frames with reference to preceding and/or following frames, and inter-compressed frames are typically called predicted frames, P-frames, or B-frames.

I. Interlaced Video and Progressive Video

A video frame contains lines of spatial information of a video signal. For progressive video, these lines contain samples starting from one time instant and continuing through successive lines to the bottom of the frame. A progressive I-frame is an intra-coded progressive video frame. A progressive P-frame is a progressive video frame coded using forward prediction, and a progressive B-frame is a progressive video frame coded using bidirectional prediction.

A typical interlaced video frame consists of two fields scanned starting at different times. For example, referring to FIG. 1, an interlaced video frame 100 includes top field 110 and bottom field 120. Typically, the even-numbered lines (top field) are scanned starting at one time (e.g., time t) and the odd-numbered lines (bottom field) are scanned starting at a different (typically later) time (e.g., time t+1). This timing can create jagged tooth-like features in regions of an interlaced video frame where motion is present when the two fields are scanned starting at different times. For this reason, interlaced video frames can be rearranged according to a field structure, with the odd lines grouped together in one field, and the even lines grouped together in another field. This arrangement, known as field coding, is useful in high-motion pictures for reduction of such jagged edge artifacts. On the other hand, in stationary regions, image detail in the interlaced video frame may be more efficiently preserved without such a rearrangement. Accordingly, frame coding is often used in stationary or low-motion interlaced video frames, in which the original alternating field line arrangement is preserved.

A typical progressive video frame consists of one frame of content with non-alternating lines. In contrast to interlaced video, progressive video does not divide video frames into separate fields, and an entire frame is scanned left to right, top to bottom starting at a single time.

II. Display Ordering and Pull-Down

The order in which decoded pictures are displayed is called the display order. The order in which the pictures are transmitted and decoded is called the coded order. The coded order is the same as the display order if there are no B-frames in the sequence. However, if B-frames are present, the coded order may not be the same as the display order because B-frames typically use temporally future reference frames as well as temporally past reference frames.

Pull-down is a process where video frame rate is artificially increased through repeated display of the same decoded frames or fields in a video sequence. Pull-down is typically performed in conversions from film to video or vice versa, or in conversions between video formats having different frame rates. For example, pull-down is performed when 24-frame-per-second film is converted to 30-frame-per-second or 60-frame-per-second video.

III. Standards for Video Compression and Decompression

Several international standards relate to video compression and decompression. These standards include the Motion Picture Experts Group ["MPEG"] 1, 2, and 4 standards and the H.261, H.262 (another title for MPEG 2), H.263 and H.264 (also called JVT/AVC) standards from the International Telecommunication Union ["ITU"]. These standards specify aspects of video decoders and formats for compressed video information. Directly or by implication, they also specify certain encoder details, but other encoder details are not specified. These standards use (or support the use of) different combinations of intraframe and interframe decompression and compression.

A. Signaling for Field Ordering and Field/Frame Repetition in the Standards

Some international standards describe bitstream elements for signaling field display order and for signaling whether certain fields or frames are to be repeated during display. The H.262 standard uses picture coding extension elements top_field_first and repeat_first_field to indicate field display order and field display repetition. When the sequence extension syntax element progressive_sequence is set to 1 (indicating the coded video sequence contains only progressive frames), top_field_first and repeat_first_field indicate how many times a reconstructed frame is to be output (i.e., once, twice or three times) by an H.262 decoder. When progressive_sequence is 0 (indicating the coded video sequence many contain progressive or interlaced frames (frame-coded or field-coded)), top_field_first indicates which field of a reconstructed frame the decoder outputs first, and repeat_first_field indicates whether the first field in the frame is to be repeated in the output of the decoder.

The MPEG 4 standard describes a top_field_first element for indicating field display order. In MPEG 4, top_field_first is a video object plane syntax element that indicates which field (top or bottom) of a reconstructed video object plane the decoder outputs first.

According to draft JVT-d157 of the JVT/AVC video standard, the slice header element pic_structure takes on one of five values to identify a picture as being one of five types: progressive frame, top field, bottom field, interlaced frame with top field first in time, or interlaced frame with bottom field first in time.

B. Limitations of the Standards

These international standards are limited in that they do not allow for signaling to indicate the presence or absence of bitstream elements for (1) signaling field display order and (2) signaling whether certain fields or frames are to be repeated during display. For example, although the H.262 standard uses picture coding extension elements top_field_first and repeat_first_field, the H.262 standard does not have a mechanism to "turn off" such elements when they are not needed.

Given the critical importance of video compression and decompression to digital video, it is not surprising that video compression and decompression are richly developed fields. Whatever the benefits of previous video compression and decompression techniques, however, they do not have the advantages of the following techniques and tools.

SUMMARY

In summary, the detailed description is directed to various techniques and tools for encoding and decoding interlaced and progressive video frames. Described embodiments implement one or more of the described techniques and tools including, but not limited to, the following:

In one aspect, a decoder processes a first bitstream element (e.g., a pull-down flag) in a first syntax layer (e.g., sequence layer or entry point layer) above frame layer in a bitstream for a video sequence, the bitstream comprising encoded source video having a source type (e.g., progressive or interlace). The decoder processes frame data in a second syntax layer (e.g., frame layer) of the bitstream for a frame (such as an interlaced frame or progressive frame, depending on source type, or a skipped frame) in the video sequence. The first bitstream element indicates whether a repeat-picture element (e.g., a repeat-frame element or a repeat field-element) is present or absent in the frame data in the second syntax layer. A repeat-frame element can indicate a number of times the frame is to be displayed (in other words, a number of display repetitions for the frame). For interlaced content, the first bitstream element can further indicate whether a field-order element (e.g., a top-field-first element) is present in the second syntax layer.

In another aspect, a pull-down flag and an interlaced content flag are received at a first syntax level in a bitstream comprising plural syntax levels. The presence or absence of a repeat-picture element in the bitstream at a second syntax level is indicated by the pull-down flag, and the interlaced content flag indicates whether the repeat-picture element is a repeat-frame element or a repeat-field element.

In another aspect, an encoder represents a first encoding decision with a flag in a sequence layer in a bitstream. The first encoding decision indicates at least in part whether to include a repeat-picture element for each of one or more pictures in the bitstream in a syntax layer below sequence level. The first encoding decision can be a decision whether to enable picture display repetition for pull-down conversion, and can further indicate whether to include a field-order element for each of one or more pictures in the bitstream.

The various techniques and tools can be used in combination or independently.

Additional features and advantages will be made apparent from the following detailed description of different embodiments that proceeds with reference to the accompanying drawings.

BRIEF DESCRIPTION OF THE DRAWINGS

FIG. 1 is a diagram showing an interlaced frame according to the prior art.

FIG. 2 is a block diagram of a suitable computing environment in conjunction with which several described embodiments may be implemented.

FIG. 7 is a flow chart showing a technique for processing frame data where the presence or absence of repeat-picture elements is signaled in a bitstream.

FIG. 8 is a diagram showing a sequence-layer bitstream syntax in a combined implementation.

FIG. 9 is a diagram showing a frame-layer bitstream syntax for progressive I-frames in a combined implementation.

FIG. 10 is a diagram showing a frame-layer bitstream syntax for progressive P-frames in a combined implementation.

FIG. 17 is a code diagram showing pseudo-code for determining a number of pan/scan windows in a combined implementation.

DETAILED DESCRIPTION

Figure 3:
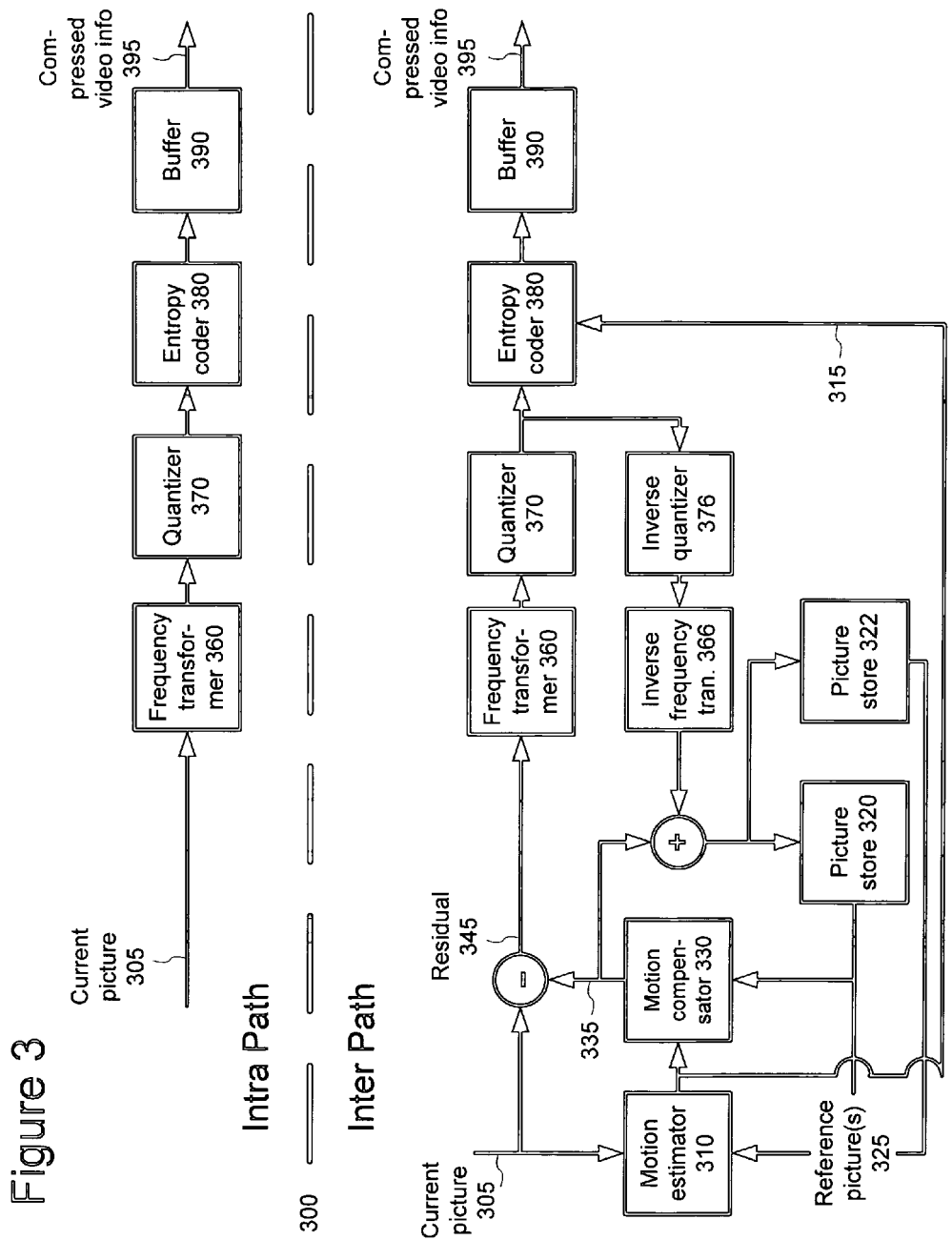
FIG. 3 is a block diagram of a generalized video encoder system in conjunction with which several described embodiments may be implemented.

The present application relates to techniques and tools for efficient compression and decompression of interlaced and progressive video. In various described embodiments, a video encoder and decoder incorporate techniques for encoding and decoding interlaced and progressive video, and corresponding signaling techniques for use with a bitstream format or syntax comprising different layers or levels (e.g., sequence level, entry point level, frame level, field level, slice level, macroblock level, and/or block level).

Various alternatives to the implementations described herein are possible. For example, techniques described with reference to flowchart diagrams can be altered by changing the ordering of stages shown in the flowcharts, by repeating or omitting certain stages, etc. As another example, although some implementations are described with reference to specific macroblock formats, other formats also can be used.

The various techniques and tools can be used in combination or independently. Different embodiments implement one or more of the described techniques and tools. Some techniques and tools described herein can be used in a video encoder or decoder, or in some other system not specifically limited to video encoding or decoding.

I. Computing Environment

FIG. 2 illustrates a generalized example of a suitable computing environment 200 in which several of the described embodiments may be implemented. The computing environment 200 is not intended to suggest any limitation as to scope of use or functionality, as the techniques and tools may be implemented in diverse general-purpose or special-purpose computing environments.

With reference to FIG. 2, the computing environment 200 includes at least one processing unit 210 and memory 220. In FIG. 2, this most basic configuration 230 is included within a dashed line. The processing unit 210 executes computer-executable instructions and may be a real or a virtual processor. In a multi-processing system, multiple processing units execute computer-executable instructions to increase processing power. The memory 220 may be volatile memory (e.g., registers, cache, RAM), non-volatile memory (e.g., ROM, EEPROM, flash memory, etc.), or some combination of the two. The memory 220 stores software 280 implementing a video encoder or decoder with one or more of the described techniques and tools.

A computing environment may have additional features. For example, the computing environment 200 includes storage 240, one or more input devices 250, one or more output devices 260, and one or more communication connections 270. An interconnection mechanism (not shown) such as a bus, controller, or network interconnects the components of the computing environment 200. Typically, operating system software (not shown) provides an operating environment for other software executing in the computing environment 200, and coordinates activities of the components of the computing environment 200.

The storage 240 may be removable or non-removable, and includes magnetic disks, magnetic tapes or cassettes, CD-ROMs, DVDs, or any other medium which can be used to store information and which can be accessed within the computing environment 200. The storage 240 stores instructions for the software 280 implementing the video encoder or decoder.

The input device(s) 250 may be a touch input device such as a keyboard, mouse, pen, or trackball, a voice input device, a scanning device, or another device that provides input to the computing environment 200. For audio or video encoding, the input device(s) 250 may be a sound card, video card, TV tuner card, or similar device that accepts audio or video input in analog or digital form, or a CD-ROM or CD-RW that reads audio or video samples into the computing environment 200. The output device(s) 260 may be a display, printer, speaker, CD-writer, or another device that provides output from the computing environment 200.

The communication connection(s) 270 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment 200, computer-readable media include memory 220, storage 240, communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "predict," "compensate," and "apply" to describe computer operations in a computing environment. These terms are high-level abstractions for operations performed by a computer, and should not be confused with acts performed by a human being. The actual computer operations corresponding to these terms vary depending on implementation.

II. Generalized Video Encoder and Decoder

Figure 4:
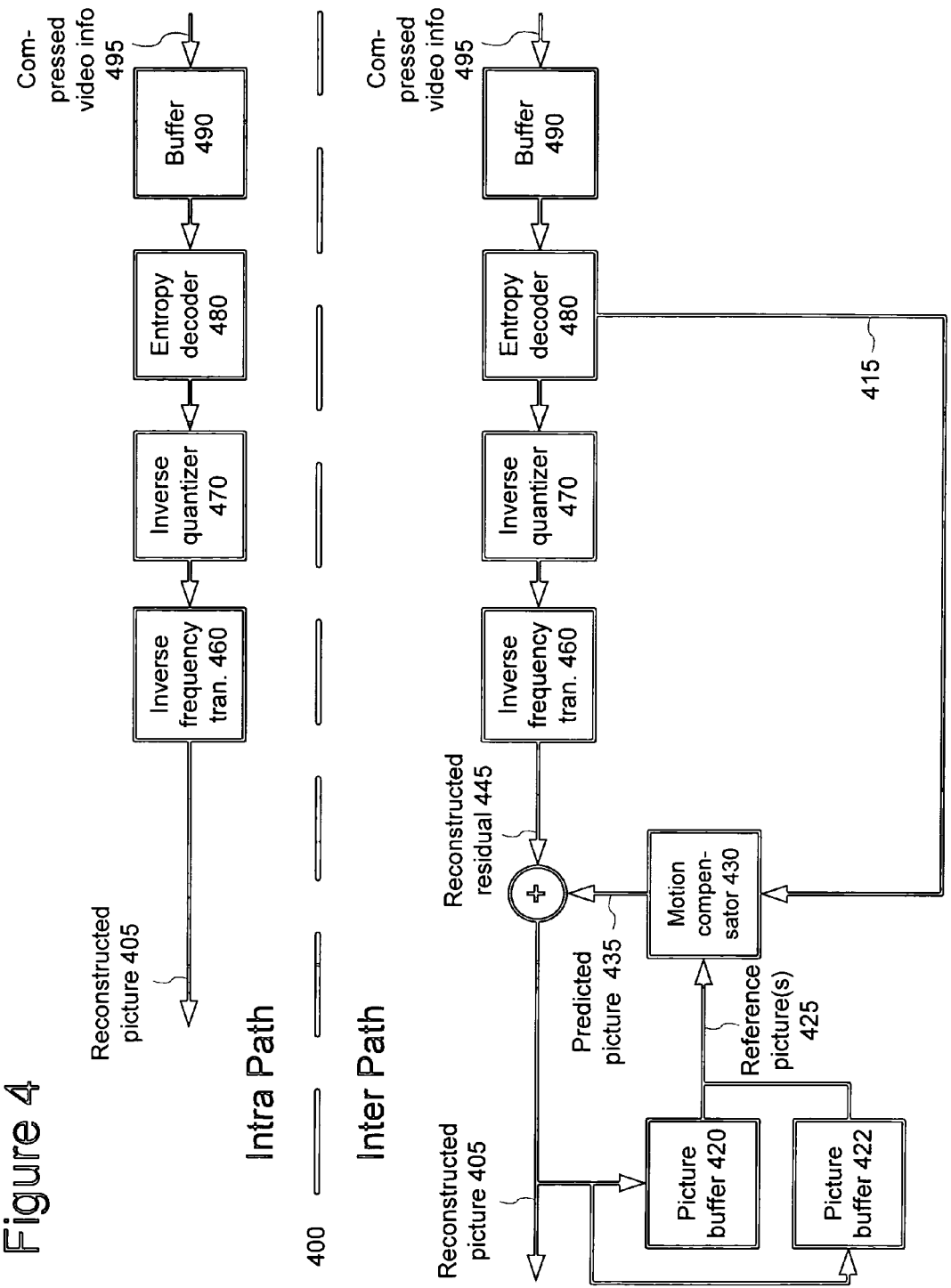
FIG. 4 is a block diagram of a generalized video decoder system in conjunction with which several described embodiments may be implemented.

FIG. 3 is a block diagram of a generalized video encoder 300 in conjunction with which some described embodiments may be implemented. FIG. 4 is a block diagram of a generalized video decoder 400 in conjunction with which some described embodiments may be implemented.

The relationships shown between modules within the encoder 300 and decoder 400 indicate general flows of information in the encoder and decoder; other relationships are not shown for the sake of simplicity. In particular, FIGS. 3 and 4 usually do not show side information indicating the encoder settings, modes, tables, etc. used for a video sequence, picture, macroblock, block, etc. Such side information is sent in the output bitstream, typically after entropy encoding of the side information. The format of the output bitstream can be a Windows Media Video version 9 format or other format.

The encoder 300 and decoder 400 process video pictures, which may be video frames, video fields or combinations of frames and fields. The bitstream syntax and semantics at the picture and macroblock levels may depend on whether frames or fields are used. There may be changes to macroblock organization and overall timing as well. The encoder 300 and decoder 400 are block-based and use a 4:2:0 macroblock format for frames, with each macroblock including four 8×8 luminance blocks (at times treated as one 16×16 macroblock) and two 8×8 chrominance blocks. For fields, the same or a different macroblock organization and format may be used. The 8×8 blocks may be further sub-divided at different stages, e.g., at the frequency transform and entropy encoding stages. Example video frame organizations are described in more detail below. Alternatively, the encoder 300 and decoder 400 are object-based, use a different macroblock or block format, or perform operations on sets of pixels of different size or configuration than 8×8 blocks and 16×16 macroblocks.

Depending on implementation and the type of compression desired, modules of the encoder or decoder can be added, omitted, split into multiple modules, combined with other modules, and/or replaced with like modules. In alternative embodiments, encoders or decoders with different modules and/or other configurations of modules perform one or more of the described techniques.

A. Video Frame Organizations

In some implementations, the encoder 300 and decoder 400 process video frames organized as follows. A frame contains lines of spatial information of a video signal. For progressive video, these lines contain samples starting from one time instant and continuing through successive lines to the bottom of the frame. A progressive video frame is divided into macroblocks such as the macroblock 500 shown in FIG. 5. The macroblock 500 includes four 8×8 luminance blocks (Y1 through Y4) and two 8×8 chrominance blocks that are co-located with the four luminance blocks but half resolution horizontally and vertically, following the conventional 4:2:0 macroblock format. The 8×8 blocks may be further subdivided at different stages, e.g., at the frequency transform (e.g., 8×4, 4×8 or 4×4 DCTs) and entropy encoding stages. A progressive I-frame is an intra-coded progressive video frame. A progressive P-frame is a progressive video frame coded using forward prediction, and a progressive B-frame is a progressive video frame coded using bi-directional prediction. Progressive P- and B-frames may include intra-coded macroblocks as well as different types of predicted macroblocks.

Figure 6A:
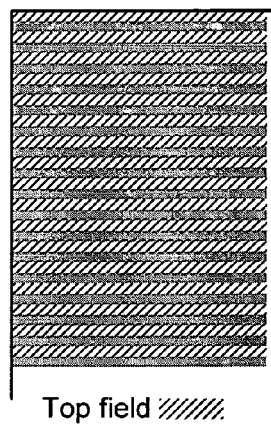
FIG. 6A is a diagram of part of an interlaced video frame, showing alternating lines of a top field and a bottom field.

An interlaced video frame consists of two scans of a frame—one comprising the even lines of the frame (the top field) and the other comprising the odd lines of the frame (the bottom field). The two fields may represent two different time periods or they may be from the same time period. FIG. 6A shows part of an interlaced video frame 600, including the alternating lines of the top field and bottom field at the top left part of the interlaced video frame 600.

Figure 5:
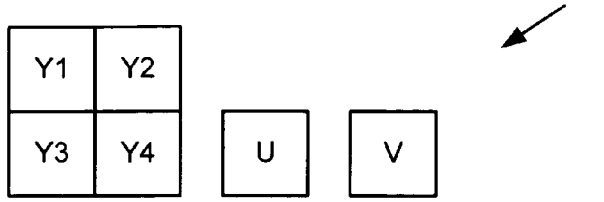
FIG. 5 is a diagram of a macroblock format used in several described embodiments.
Figure 6B:
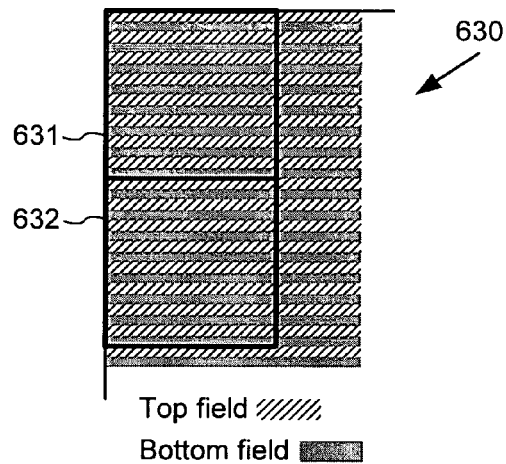
FIG. 6B is a diagram of the interlaced video frame organized for encoding/decoding as a frame.

FIG. 6B shows the interlaced video frame 600 of FIG. 6A organized for encoding/decoding as a frame 630. The interlaced video frame 600 has been partitioned into macroblocks such as the macroblocks 631 and 632, which use a 4:2:0 format as shown in FIG. 5. In the luminance plane, each macroblock 631, 632 includes 8 lines from the top field alternating with 8 lines from the bottom field for 16 lines total, and each line is 16 pixels long. (The actual organization and placement of luminance blocks and chrominance blocks within the macroblocks 631, 632 are not shown, and in fact may vary for different encoding decisions.) Within a given macroblock, the top-field information and bottom-field information may be coded jointly or separately at any of various phases. An interlaced I-frame is two intra-coded fields of an interlaced video frame, where a macroblock includes information for the two fields. An interlaced P-frame is two fields of an interlaced video frame coded using forward prediction, and an interlaced B-frame is two fields of an interlaced video frame coded using bi-directional prediction, where a macroblock includes information for the two fields. Interlaced P- and B-frames may include intra-coded macroblocks as well as different types of predicted macroblocks. Interlaced BI-frames are a hybrid of interlaced I-frames and interlaced B-frames; they are intra-coded, but are not used as anchors for other frames.

Figure 6C:
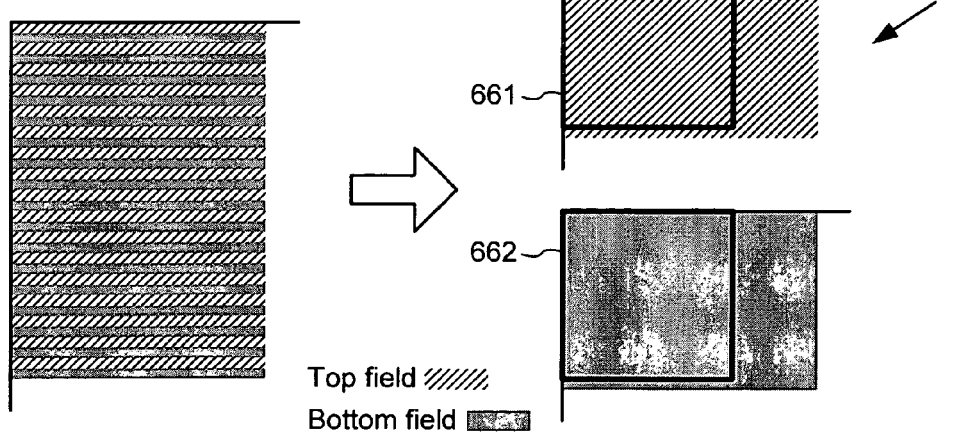
FIG. 6C is a diagram of the interlaced video frame organized for encoding/decoding as fields.

FIG. 6C shows the interlaced video frame 600 of FIG. 6A organized for encoding/decoding as fields 660. Each of the two fields of the interlaced video frame 600 is partitioned into macroblocks. The top field is partitioned into macroblocks such as the macroblock 661, and the bottom field is partitioned into macroblocks such as the macroblock 662. (Again, the macroblocks use a 4:2:0 format as shown in FIG. 5, and the organization and placement of luminance blocks and chrominance blocks within the macroblocks are not shown.) In the luminance plane, the macroblock 661 includes 16 lines from the top field and the macroblock 662 includes 16 lines from the bottom field, and each line is 16 pixels long. An interlaced I-field is a single, separately represented field of an interlaced video frame. An interlaced P-field is a single, separately represented field of an interlaced video frame coded using forward prediction, and an interlaced B-field is a single, separately represented field of an interlaced video frame coded using bi-directional prediction. Interlaced P- and B-fields may include intra-coded macroblocks as well as different types of predicted macroblocks. Interlaced BI-fields are a hybrid of interlaced I-fields and interlaced B-fields; they are intra-coded, but are not used as anchors for other fields.

Interlaced video frames organized for encoding/decoding as fields can include various combinations of different field types. For example, such a frame can have the same field type in both the top and bottom fields or different field types in each field. In one implementation, the possible combinations of field types include I/I, I/P, P/I, P/P, B/B, B/BI, BI/B, and BI/BI.

The term picture generally refers to source, coded or reconstructed image data. For progressive video, a picture is a progressive video frame. For interlaced video, a picture may refer to an interlaced video frame, the top field of the frame, or the bottom field of the frame, depending on the context.

A predicted picture that is identical to its reference frame is called a skipped picture. The reconstruction of the skipped picture is equivalent conceptually to copying the reference frame. In general, a signal indicating a skipped picture means that no further image data is transmitted for this frame. Additional data may still be sent relating to, for example, field/frame display repetition, which is described in further detail below.

Alternatively, the encoder 300 and decoder 400 are object-based, use a different macroblock or block format, or perform operations on sets of pixels of different size or configuration than 8×8 blocks and 16×16 macroblocks.

B. Video Encoder

FIG. 3 is a block diagram of a generalized video encoder system 300. The encoder system 300 receives a sequence of video pictures including a current picture 305 (e.g., progressive video frame, interlaced video frame, or field of an interlaced video frame), and produces compressed video information 395 as output. Particular embodiments of video encoders typically use a variation or supplemented version of the generalized encoder 300.

The encoder system 300 compresses predicted pictures and key pictures. For the sake of presentation, FIG. 3 shows a path for key pictures through the encoder system 300 and a path for predicted pictures. Many of the components of the encoder system 300 are used for compressing both key pictures and predicted pictures. The exact operations performed by those components can vary depending on the type of information being compressed.

A predicted picture (e.g., progressive P-frame or B-frame, interlaced P-field or B-field, or interlaced P-frame or B-frame) is represented in terms of prediction (or difference) from one or more other pictures (which are typically referred to as reference pictures or anchors). A prediction residual is the difference between what was predicted and the original picture. In contrast, a key picture (e.g., progressive I-frame, interlaced I-field, or interlaced I-frame) is compressed without reference to other pictures.

If the current picture 305 is a forward-predicted picture, a motion estimator 310 estimates motion of macroblocks or other sets of pixels of the current picture 305 with respect to one or more reference pictures, for example, the reconstructed previous picture 325 buffered in the picture store 320. If the current picture 305 is a bi-directionally-predicted picture, a motion estimator 310 estimates motion in the current picture 305 with respect to up to four reconstructed reference pictures (for an interlaced B-field, for example). Typically, a motion estimator estimates motion in a B-picture with respect to one or more temporally previous reference pictures and one or more temporally future reference pictures. Accordingly, the encoder system 300 can use the separate stores 320 and 322 for multiple reference pictures. For more information on progressive B-frames and interlaced B-frames and B-fields, see U.S. patent application Ser. No. 10/622,378, entitled, "Advanced Bi-Directional Predictive Coding of Video Frames," filed Jul. 18, 2003, and U.S. patent application Ser. No. 10/882,135, entitled, "Advanced Bi-Directional Predictive Coding of Interlaced Video," filed Jun. 29, 2004.

The motion estimator 310 can estimate motion by pixel, ½ pixel, ¼ pixel, or other increments, and can switch the precision of the motion estimation on a picture-by-picture basis or other basis. The motion estimator 310 (and compensator 330) also can switch between types of reference picture pixel interpolation (e.g., between bicubic and bilinear) on a per-frame or other basis. The precision of the motion estimation can be the same or different horizontally and vertically. The motion estimator 310 outputs as side information motion information 315 such as differential motion vector information. The encoder 300 encodes the motion information 315 by, for example, computing one or more predictors for motion vectors, computing differentials between the motion vectors and predictors, and entropy coding the differentials. To reconstruct a motion vector, a motion compensator 330 combines a predictor with differential motion vector information.

The motion compensator 330 applies the reconstructed motion vector to the reconstructed picture(s) 325 to form a motion-compensated current picture 335. The prediction is rarely perfect, however, and the difference between the motion-compensated current picture 335 and the original current picture 305 is the prediction residual 345. During later reconstruction of the picture, the prediction residual 345 is added to the motion compensated current picture 335 to obtain a reconstructed picture that is closer to the original current picture 305. In lossy compression, however, some information is still lost from the original current picture 305. Alternatively, a motion estimator and motion compensator apply another type of motion estimation/compensation.

A frequency transformer 360 converts the spatial domain video information into frequency domain (i.e., spectral) data. For block-based video pictures, the frequency transformer 360 applies a DCT, variant of DCT, or other block transform to blocks of the pixel data or prediction residual data, producing blocks of frequency transform coefficients. Alternatively, the frequency transformer 360 applies another conventional frequency transform such as a Fourier transform or uses wavelet or sub-band analysis. The frequency transformer 360 may apply an 8×8, 8×4, 4×8, 4×4 or other size frequency transform.

A quantizer 370 then quantizes the blocks of spectral data coefficients. The quantizer applies uniform, scalar quantization to the spectral data with a step-size that varies on a picture-by-picture basis or other basis. Alternatively, the quantizer applies another type of quantization to the spectral data coefficients, for example, a non-uniform, vector, or non-adaptive quantization, or directly quantizes spatial domain data in an encoder system that does not use frequency transformations. In addition to adaptive quantization, the encoder 300 can use frame dropping, adaptive filtering, or other techniques for rate control.

The encoder 300 may use special signaling for a skipped macroblock, which is a macroblock that has no information of certain types (e.g., no differential motion vectors for the macroblock and no residual information).

When a reconstructed current picture is needed for subsequent motion estimation/compensation, an inverse quantizer 376 performs inverse quantization on the quantized spectral data coefficients. An inverse frequency transformer 366 then performs the inverse of the operations of the frequency transformer 360, producing a reconstructed prediction residual (for a predicted picture) or a reconstructed key picture. If the current picture 305 was a key picture, the reconstructed key picture is taken as the reconstructed current picture (not shown). If the current picture 305 was a predicted picture, the reconstructed prediction residual is added to the motion-compensated current picture 335 to form the reconstructed current picture. One or both of the picture stores 320, 322 buffers the reconstructed current picture for use in motion compensated prediction. In some embodiments, the encoder applies a de-blocking filter to the reconstructed frame to adaptively smooth discontinuities and other artifacts in the picture.

The entropy coder 380 compresses the output of the quantizer 370 as well as certain side information (e.g., motion information 315, quantization step size). Typical entropy coding techniques include arithmetic coding, differential coding, Huffman coding, run length coding, LZ coding, dictionary coding, and combinations of the above. The entropy coder 380 typically uses different coding techniques for different kinds of information (e.g., DC coefficients, AC coefficients, different kinds of side information), and can choose from among multiple code tables within a particular coding technique.

The entropy coder 380 provides compressed video information 395 to the multiplexer ["MUX"] 390. The MUX 390 may include a buffer, and a buffer level indicator may be fed back to bit rate adaptive modules for rate control. Before or after the MUX 390, the compressed video information 395 can be channel coded for transmission over the network. The channel coding can apply error detection and correction data to the compressed video information 395.

C. Video Decoder

FIG. 4 is a block diagram of a general video decoder system 400. The decoder system 400 receives information 495 for a compressed sequence of video pictures and produces output including a reconstructed picture 405 (e.g., progressive video frame, interlaced video frame, or field of an interlaced video frame). Particular embodiments of video decoders typically use a variation or supplemented version of the generalized decoder 400.

The decoder system 400 decompresses predicted pictures and key pictures. For the sake of presentation, FIG. 4 shows a path for key pictures through the decoder system 400 and a path for forward-predicted pictures. Many of the components of the decoder system 400 are used for decompressing both key pictures and predicted pictures. The exact operations performed by those components can vary depending on the type of information being decompressed.

A DEMUX 490 receives the information 495 for the compressed video sequence and makes the received information available to the entropy decoder 480. The DEMUX 490 may include a jitter buffer and other buffers as well. Before or after the DEMUX 490, the compressed video information can be channel decoded and processed for error detection and correction.

The entropy decoder 480 entropy decodes entropy-coded quantized data as well as entropy-coded side information (e.g., motion information 415, quantization step size), typically applying the inverse of the entropy encoding performed in the encoder. Entropy decoding techniques include arithmetic decoding, differential decoding, Huffman decoding, run length decoding, LZ decoding, dictionary decoding, and combinations of the above. The entropy decoder 480 typically uses different decoding techniques for different kinds of information (e.g., DC coefficients, AC coefficients, different kinds of side information), and can choose from among multiple code tables within a particular decoding technique.

The decoder 400 decodes the motion information 415 by, for example, computing one or more predictors for motion vectors, entropy decoding differential motion vectors, and combining decoded differential motion vectors with predictors to reconstruct motion vectors.

A motion compensator 430 applies motion information 415 to one or more reference pictures 425 to form a prediction 435 of the picture 405 being reconstructed. For example, the motion compensator 430 uses one or more macroblock motion vector to find macroblock(s) in the reference picture(s) 425. One or more picture stores (e.g., picture store 420, 422) store previous reconstructed pictures for use as reference pictures. Typically, B-pictures have more than one reference picture (e.g., at least one temporally previous reference picture and at least one temporally future reference picture). Accordingly, the decoder system 400 can use separate picture stores 420 and 422 for multiple reference pictures. The motion compensator 430 can compensate for motion at pixel, ½ pixel, ¼ pixel, or other increments, and can switch the precision of the motion compensation on a picture-by-picture basis or other basis. The motion compensator 430 also can switch between types of reference picture pixel interpolation (e.g., between bicubic and bilinear) on a per-frame or other basis. The precision of the motion compensation can be the same or different horizontally and vertically. Alternatively, a motion compensator applies another type of motion compensation. The prediction by the motion compensator is rarely perfect, so the decoder 400 also reconstructs prediction residuals.

An inverse quantizer 470 inverse quantizes entropy-decoded data. In general, the inverse quantizer applies uniform, scalar inverse quantization to the entropy-decoded data with a step-size that varies on a picture-by-picture basis or other basis. Alternatively, the inverse quantizer applies another type of inverse quantization to the data, for example, to reconstruct after a non-uniform, vector, or non-adaptive quantization, or directly inverse quantizes spatial domain data in a decoder system that does not use inverse frequency transformations.

An inverse frequency transformer 460 converts the quantized, frequency domain data into spatial domain video information. For block-based video pictures, the inverse frequency transformer 460 applies an inverse DCT ["IDCT"], variant of IDCT, or other inverse block transform to blocks of the frequency transform coefficients, producing pixel data or prediction residual data for key pictures or predicted pictures, respectively. Alternatively, the inverse frequency transformer 460 applies another conventional inverse frequency transform such as an inverse Fourier transform or uses wavelet or sub-band synthesis. The inverse frequency transformer 460 may apply an 8×8, 8×4, 4×8, 4×4, or other size inverse frequency transform.

For a predicted picture, the decoder 400 combines the reconstructed prediction residual 445 with the motion compensated prediction 435 to form the reconstructed picture 405. When the decoder needs a reconstructed picture 405 for subsequent motion compensation, one or both of the picture stores (e.g., picture store 420) buffers the reconstructed picture 405 for use in predicting the next picture. In some embodiments, the decoder 400 applies a de-blocking filter to the reconstructed picture to adaptively smooth discontinuities and other artifacts in the picture.

III. Signaling For Field Ordering and Display Repetition

Described embodiments include techniques and tools for signaling field ordering and for signaling whether fields or frames are to be repeated during display. Described techniques and tools apply to progressive and interlaced content.

In video pull-down conversions (e.g., from 24-frame-per-second film to 30-frame-per-second or 60-frame-per-second video), frame/field rate is artificially increased after decoding through repeated display of the same decoded frames or fields in a video sequence. Pull-down conversions are important for interoperability of NTSC video and film footage. Thus, to provide appropriate metadata relating to pull-down conversions, users of interlaced content need a way to send pull-down and field sequencing information, while users of progressive content need a way to send pull-down information only, without sending superfluous information that applies only to interlaced content.

Accordingly, described techniques and tools provide a way for broadcasters and other users of digital video to efficiently send information pertaining to pull-down and the sequencing of interlace field pictures in a bitstream. Described techniques and tools included signaling techniques to indicate the presence or absence of bitstream elements for signaling field display order and bitstream elements for signaling whether certain fields or frames are to be repeated during display, allowing an encoder/decoder to "turn off" such elements when they are not needed. For example, turning off elements relating to interlaced content (e.g., repeat-field and field-ordering elements) results in bitrate savings for pure progressive content.

The syntax elements described herein are only examples; other syntax elements can be used in accordance with the described techniques. Furthermore, the syntax elements can be of different sizes or structures and can be used in different syntax layers in accordance with the described techniques and tools.

The described techniques and tools can be used in combination with one another or with other techniques and tools, or can be used independently.

A. Pull-Down Signaling

To facilitate pull-down for interlaced or progressive content, an encoder sends one or more repeat-picture (e.g., repeat-frame or repeat-field) elements to indicate which pictures (e.g., frames or fields), if any, are to be repeated during display (e.g., to increase playback frame/field rate) Accordingly, in one implementation, an encoder sends a syntax element (e.g., in a sequence layer in a bitstream having plural layers) to indicate whether repeat-picture elements are present in the bitstream. For example, an encoder sends a 1-bit syntax element (PULLDOWN) to indicate whether one or more repeat-picture elements are present in the bitstream for either progressive or interlaced content. A decoder performs corresponding decoding.

FIG. 7 shows a technique 700 for decoding frame data where the presence or absence of repeat-picture elements is signaled in a bitstream. At 710, a decoder processes a bitstream element (e.g., PULLDOWN) at a layer above frame layer (e.g., sequence layer). The bitstream element indicates the presence or absence of one or more repeat-picture elements (e.g., RFF, RPTFRM, or other repeat-picture elements) at frame layer in the bitstream. At 720, the decoder processes the frame layer data, such as by decoding repeat-picture elements that may be present in the bitstream.

In one implementation, an encoder/decoder uses the PULLDOWN element for progressive or interlaced content. The specific repeat-picture elements signaled by the PULLDOWN element will depend on whether the content is progressive or interlaced. For example, in one implementation, the INTERLACE flag is a sequence layer element that indicates whether the content of the video is interlaced or progressive. If INTERLACE=1, the content is interlaced; if INTERLACE=0, the content is progressive.

For interlaced content, PULLDOWN indicates whether the repeat-picture syntax element Repeat First Field (RFF) is present in the bitstream. PULLDOWN also indicates whether the field-ordering element Top Field First (TFF) is present in the bitstream.

In one implementation, when a sequence has an interlaced target display type (INTERLACE=1) and pull-down is used (PULLDOWN=1), picture headers contain the one-bit repeat-picture element RFF. The time allotted for displaying a single field without repeating the field is called a field period. Thus, two field periods are required to display each field once in a frame having two fields. When the RFF flag is set for a frame, the display process displays the first field of a field pair a second time after displaying the second field of the pair—thus extending the duration of the display of the frame having the field pair to three field display periods.

The order in which the two fields of a frame are displayed on the target display is determined by the TFF flag in the picture header. For example, if TFF=1, the decoded field spatially closer to the top of the display (i.e., the top field) is displayed for one display field period, followed by the decoded field spatially closer to the bottom of the display. If TFF=0, the decoded field spatially closer to the bottom of the display (i.e., the bottom field) is displayed for one display field period, followed by the top field.

When a decoded frame is displayed for three display field periods, the subsequent decoded frame is flagged with the opposite value of TFF (i.e. if the first decoded frame has TFF=1, the second decoded frame has TFF=0). This ensures that a top field always follows a bottom field, and vice versa, in display order, regardless of whether the first field is repeated.

In this implementation, if PULLDOWN=0, decoded pictures are displayed as if TFF=1, but TFF is not explicitly sent in the bitstream. In other words, the top field is first by default.

For progressive content, PULLDOWN indicates whether the repeat-picture syntax element RPTFRM is present in the bitstream. In one implementation, RPTFRM is a two-bit element indicating how many times (from zero to three) a progressive frame is to be repeated during display. For example, if a compressed 24-fps bitstream is targeted for a 60-fps progressive display, the value of RPTFRM alternates between 1 and 2 in successive frames, and the display process may then display decoded frames for 2 or 3 display frame periods, respectively.

Alternatively, repeat-picture elements and field-order elements indicate different information, such as different numbers of picture display repetitions (e.g., for different conversion ratios), or different display ordering.

As another alternative, an encoder sends an entry point layer syntax element to indicate whether repeat-picture elements and/or field-order elements are present. In general, an entry point marks a position in a bitstream (e.g., an I-frame or other key frame) at which a decoder can begin decoding. In other words, no pictures before the entry point in the bitstream are needed to decode pictures after the entry point that are within an entry point segment. An encoder can use an entry point header element to signal whether repeat-picture elements and/or field-order elements are present within an entry point segment.

Field-order elements do not affect the decoding process, and therefore can be ignored by a decoder.

B. Pan/Scan Windows

A pan/scan region is a sub-region of the display region which can be used as an alternative presentation format. The most common application is to display a 4:3 sub-region of 16:9 content. A pan/scan window is a portion of video displayed on a screen as a result of a view selection.

In one embodiment, the INTERLACE, PULLDOWN, RFF and RPTFRM bitstream elements determine a number of pan/scan windows present for each displayed field or frame. The relationship of these bitstream elements to pan/scan windows is described in further detail in Section IV, below.

Like display-ordering elements, pan-scan information does not affect the decoding process, and can be ignored by a decoder.

IV. Combined Implementations

A detailed combined implementation for a bitstream syntax, semantics, and decoder are now described, in addition to an alternative combined implementation with minor differences from the main combined implementation.

A. Bitstream Syntax

In various combined implementations, data is presented in the form of a bitstream having plural layers (e.g., sequence, entry point, frame, field, macroblock, block and/or sub-block layers).

In the syntax diagrams, arrow paths show the possible flows of syntax elements. Syntax elements shown with square-edged boundaries indicate fixed-length syntax elements; those with rounded boundaries indicate variable-length syntax elements and those with a rounded boundary within an outer rounded boundary indicate a syntax element (e.g., a bitplane) made up of simpler syntax elements. A fixed-length syntax element is defined to be a syntax element for which the length of the syntax element is not dependent on data in the syntax element itself; the length of a fixed-length syntax element is either constant or determined by prior data in the syntax flow. A lower layer in a layer diagram (e.g., a macroblock layer in a frame-layer diagram) is indicated by a rectangle within a rectangle.

Sequence-level bitstream elements are shown in FIG. 8. Sequence-level elements are used to decode a sequence of compressed video frames. Sequence-level data can affect the interpretation or presence of elements at other levels (e.g., entry point level, frame level, macroblock level, etc.) In general, an entry point marks a position in a bitstream (e.g., an I-frame or other key frame) at which a decoder can begin decoding. In other words, no pictures before the entry point in the bitstream are needed to decode pictures after the entry point. An entry point header can be used to signal changes in coding control parameters (e.g., enabling or disabling compression tools for frames following an entry point).

Figure 11:
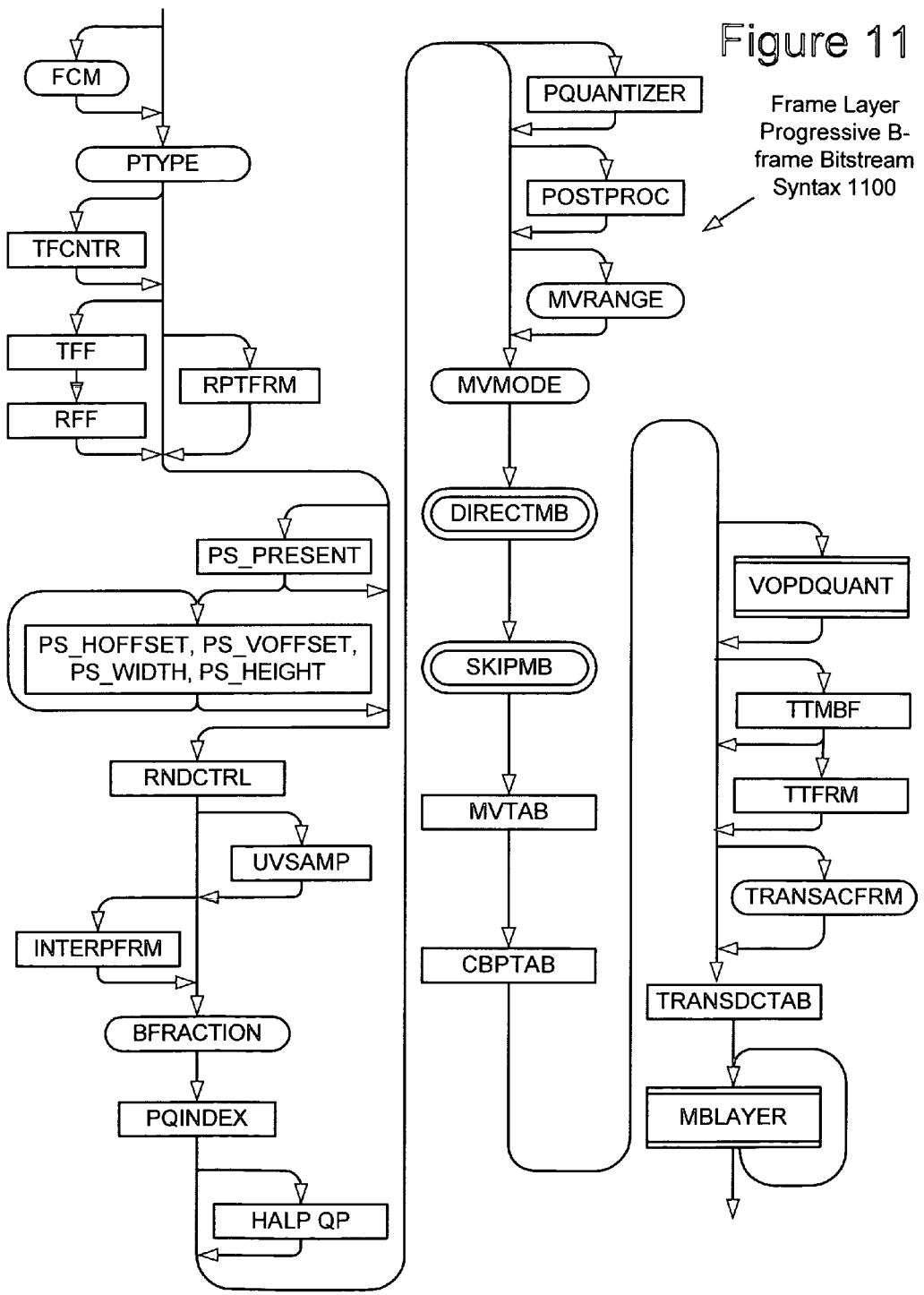
FIG. 11 is a diagram showing a frame-layer bitstream syntax for progressive B-frames in a combined implementation.

For progressive I-frames, P-frames, and B-frames, frame-level bitstream elements are shown in FIGS. 9, 10, and 11, respectively. (Frame-level bitstream elements for progressive BI-frames are identical to those for progressive I-frames.) Data for each frame consists of a frame header followed by data for the macroblock layer (whether for intra or various inter type macroblocks).

Figure 12:
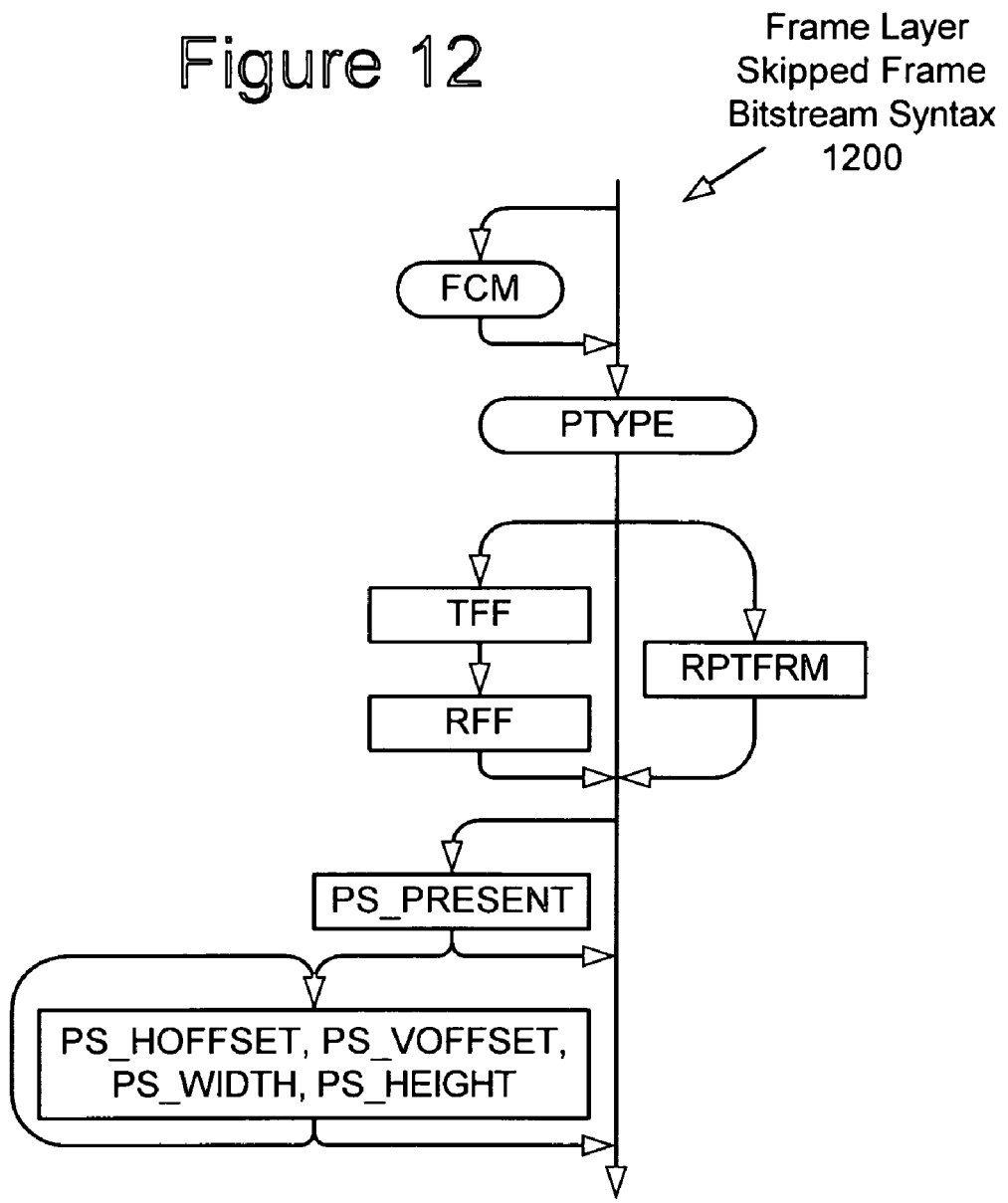
FIG. 12 is a diagram showing a frame-layer bitstream syntax for skipped frames in a combined implementation.

For progressive skipped frames, frame-level bitstream elements are shown in FIG. 12. (Frame-level bitstream elements for interlaced skipped frames are identical to those for progressive skipped frames.)

Figure 13:
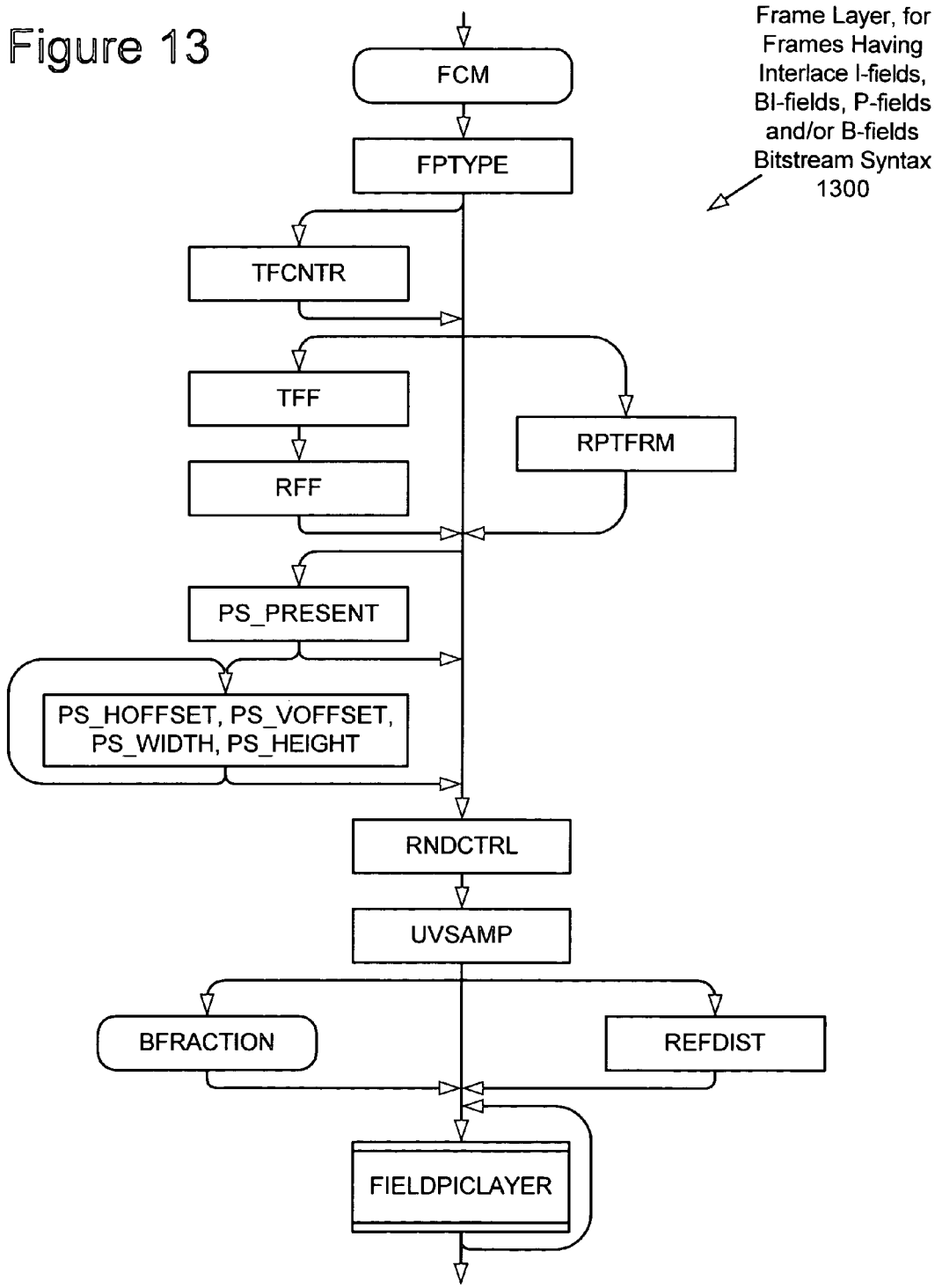
FIG. 13 is a diagram showing a frame-layer bitstream syntax for interlaced I-fields, BI-fields, P-fields or B-fields in a combined implementation.

For interlaced video frames with interlaced I-fields, P-fields, B-fields and/or BI-fields, frame-level bitstream elements are shown in FIG. 13. Data for each frame consists of a frame header followed by data for the field layers (shown as the repeated "FieldPicLayer" element per field) and data for the macroblock layers (whether for intra, 1 MV, or 4 MV macroblocks).

Figure 14:
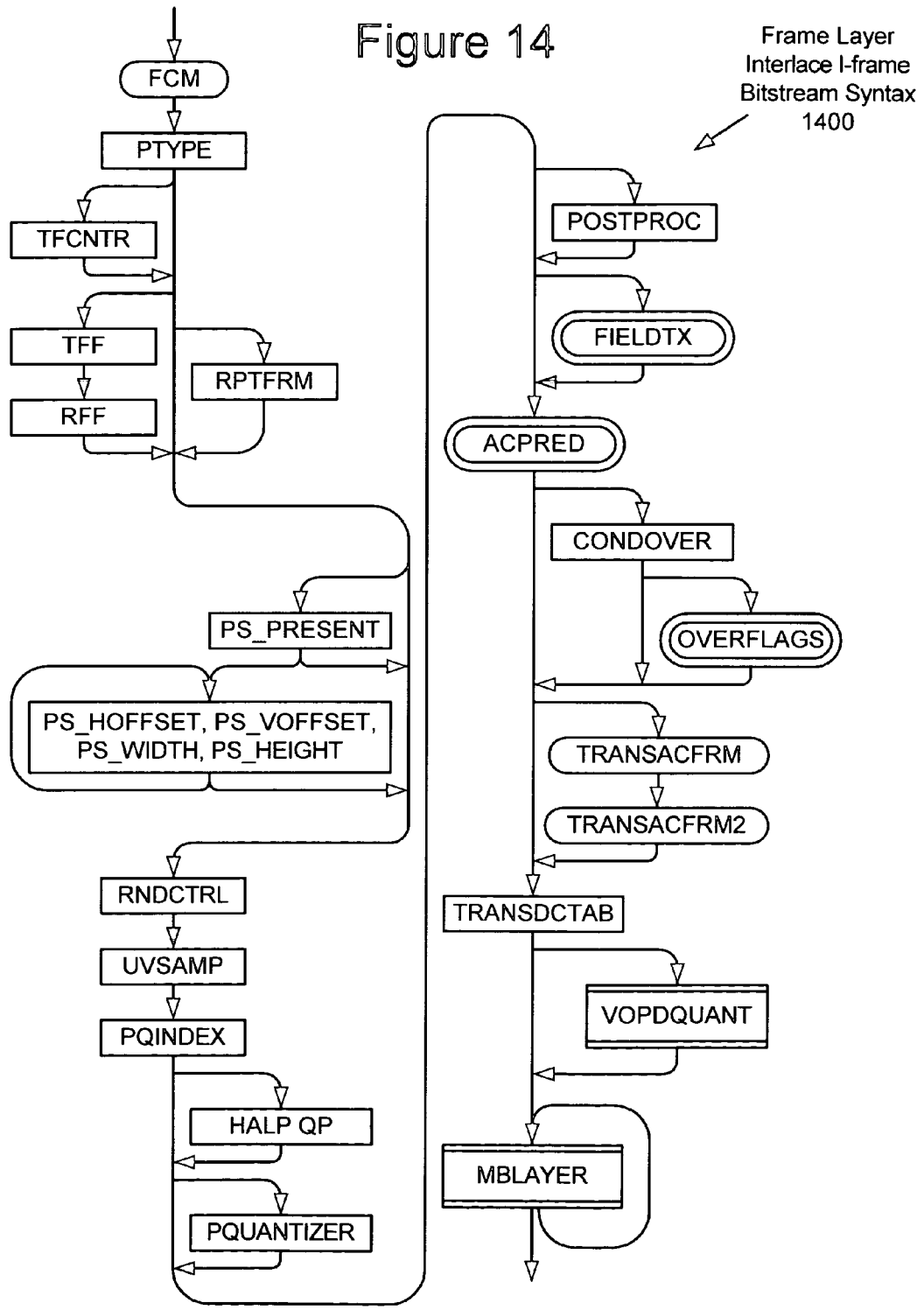
FIG. 14 is a diagram showing a frame-layer bitstream syntax for interlaced I-frames in a combined implementation.
Figure 15:
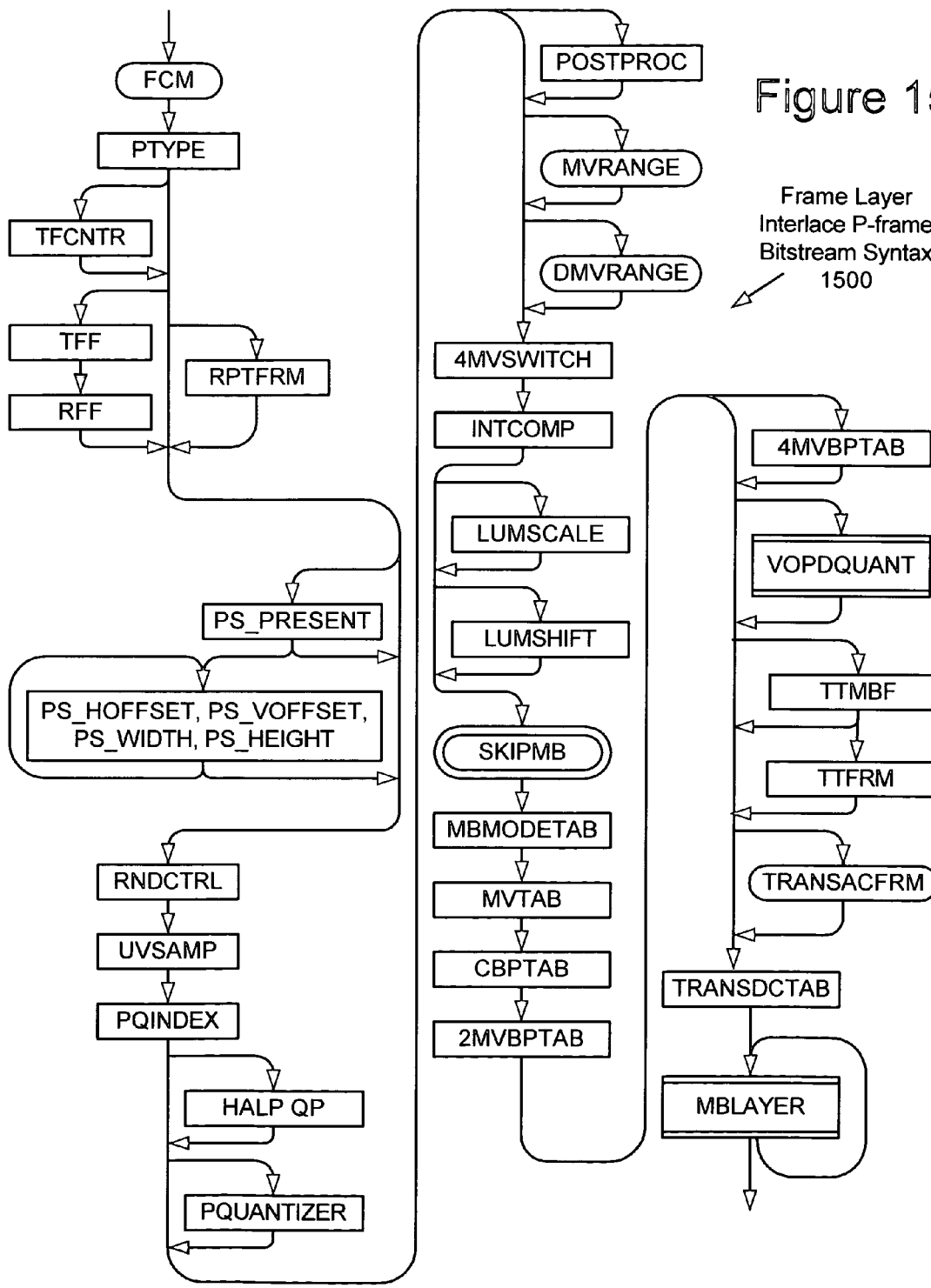
FIG. 15 is a diagram showing a frame-layer bitstream syntax for interlaced P-frames in a combined implementation.
Figure 16:
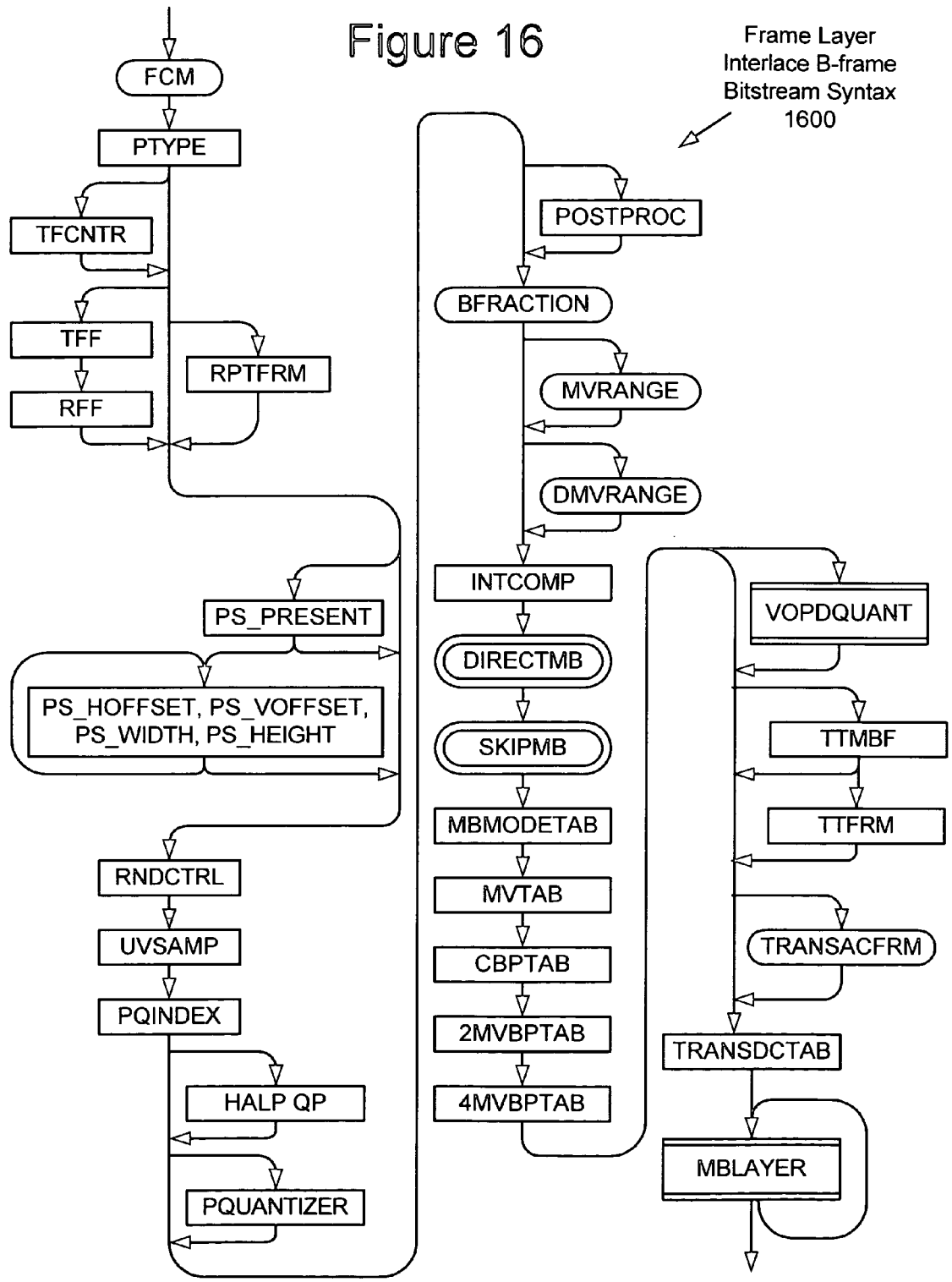
FIG. 16 is a diagram showing a frame-layer bitstream syntax for interlaced B-frames in a combined implementation.

For interlaced I-frames, P-frames, and B-frames, frame-level bitstream elements are shown in FIGS. 14, 15, and 16, respectively. (Frame-level bitstream elements for interlaced BI-frames are identical to those for interlaced I-frames.) Data for each frame consists of a frame header followed by data for the macroblock layer (whether for intra or various inter type macroblocks).

The following sections describe selected bitstream elements in the sequence and frame layers that are related to signaling for interlaced and progressive pictures. Although the selected bitstream elements are described in the context of a particular layer, some bitstream elements can be used in more than one layer.

1. Selected Sequence Layer Elements

FIG. 8 is a diagram showing a sequence-layer bitstream syntax for progressive and/or interlaced video. Specific bitstream elements are described below.

Pull-Down Flag (PULLDOWN) (1 bit)

PULLDOWN is a 1-bit syntax element that indicates if the syntax elements RPTFRM, or TFF and RFF are present in frame headers. PULLDOWN, RPTFRM, TFF and RFF are discussed in further detail below and above in Section III.

Interlace Content (INTERLACE) (1 bit)

INTERLACE is a 1-bit syntax element. INTERLACE=0 signals that the source content is progressive. INTERLACE=1 signals that the source content is interlaced. The individual frames may still be coded using the progressive or interlace syntax when INTERLACE=1. If PULLDOWN=1, the INTERLACE syntax element specifies if it is TFF and RFF, or RPTFRM that is present in the picture headers. INTERLACE is discussed in further detail below and above in Section III.

2. Selected Frame Layer Elements

FIGS. 9, 10, and 11 are diagrams showing frame-level bitstream syntaxes for progressive I-frames, P-frames and B-frames, respectively. (Frame-level bitstream elements for progressive BI-frames are identical to those for progressive I-frames.) FIG. 12 is a diagram showing a frame-layer bitstream syntax for progressive skipped frames. (Frame-level bitstream elements for interlaced skipped frames are identical to those for progressive skipped frames.) FIG. 13 is a diagram showing a frame-layer bitstream syntax for frames containing interlaced I-fields, P-fields, B-fields and/or BI-fields (or potentially other kinds of interlaced fields). FIGS. 14, 15, and 16 are diagrams showing frame-level bitstream syntaxes for interlaced I-frames, P-frames and B-frames, respectively. (Frame-level bitstream elements for interlaced BI-frames are identical to those for interlaced I-frames.) Specific bitstream elements are described below.

Frame Coding Mode (FCM) (Variable Size)

FCM is a variable length codeword ["VLC"] used to indicate the picture coding type. FCM takes on values for frame coding modes as shown in Table 1 below:

TABLE 1

Frame Coding Mode VLC

| FCM value | Frame Coding Mode |
|---|---|
| 0 | Progressive |
| 10 | Frame-Interlace |
| 11 | Field-Interlace |

Field Picture Type (FPTYPE) (3 Bits)

FPTYPE is a three-bit syntax element present in the frame header for a frame including interlaced P-fields, interlaced I-fields, interlaced B-fields, and/or interlaced BI-fields, and potentially other kinds of fields. FPTYPE takes on values for different combinations of field types in the interlaced video frame, according to Table 2 below.

TABLE 2

Field Picture Type FLC

| FPTYPE FLC | First Field Type | Second Field Type |
|---|---|---|
| 000 | I | I |
| 001 | I | P |
| 010 | P | I |
| 011 | P | P |
| 100 | B | B |
| 101 | B | BI |
| 110 | BI | B |
| 111 | BI | BI |

In an alternative combined implementation, the picture type information is signaled at the beginning of the field level for a field, instead of at the frame level for the interlaced video frame including the field.

Picture Type (PTYPE) (Cariable Size)

PTYPE is a variable size syntax element present in the frame header for progressive and interlaced frames. PTYPE takes on values for different frame types according to Table 3 below.

TABLE 3

Picture Type VLC

| PTYPE VLC | Picture Type |
|---|---|
| 110 | I |
| 0 | P |
| 10 | B |
| 1110 | BI |
| 1111 | Skipped |

If PTYPE indicates that the frame is skipped then the frame is treated as a P-frame that is identical to its reference frame. The reconstruction of the skipped frame is equivalent conceptually to copying the reference frame. A skipped frame means that no further image data is transmitted for this frame, although additional data may be sent relating to display of the frame (e.g., TFF, RFF and/or RPTFRM fields).

Top Field First (TFF) (1 Bit)

TFF is a one-bit element that is present if the sequence header element PULLDOWN is set to '1' and the sequence header element INTERLACE=1. TFF=1 implies that the top field is the first decoded field. If TFF=0, the bottom field is the first decoded field. If PULLDOWN is set to '0', TFF is not present, and its value shall be assumed to be '1'. TFF is discussed in further detail below and above in Section III.

Repeat First Field (RFF) (1 Bit)

RFF is a one-bit element that is present if the sequence header element PULLDOWN is set to '1' and the sequence header element INTERLACE=1. RFF is not part of the decoding process, but it is used during display. RFF=1 implies that the first field should be repeated during display. RFF=0 implies that no repetition is necessary. RFF is discussed in further detail below and above in Section III.

Repeat Frame Count (RPTFRM) (2 Bits)

RPTFRM is a two-bit syntax element that is present if the sequence header element PULLDOWN is set to '1' and the sequence header element INTERLACE=0. RPTFRM takes a value from 0 to 3 which is coded in binary using 2 bits. RPTFRM is not part of the decoding process, but it is used during display. It represents the number of times a frame is repeated during display. RPTFRM is discussed in further detail below and above in Section III.

B. Display Metadata

This combined implementation includes a number of fields which provide information useful to the post-decode display process. This information is output by the decoder and may be used by the display process to adapt the decoded pictures to a format appropriate for the output of the display process.

1. Frame Rate

In this combined implementation frame rate fields (e.g., FRAMERATEIND, FRAMERATEEX, FRAMERATENR, FRAMERATEDR) represent the target display frame rate for the compressed stream. In the case of content with an interlaced target display (INTERLACE=1 in the sequence header), the frame rate is one-half the field rate of the target display.

The frame rate represents the output of the display process, and not necessarily the output of the decoding process (i.e., coded pictures in the compressed stream can occur less frequently than the target display frame rate).

Repeating Progressive Frames

For content with a progressive target display type (INTERLACE=0), when pull-down is used (PULLDOWN=1), picture headers contain the integer field RPTFRM. RPTFRM represents the number of times the decoded frame may be repeated by the display process. For example, if a compressed bit stream with 24 frames per second is targeted for a 60-frame-per-second progressive display (INTERLACE=0, FRAMERATEEX=0×0780), RPTFRM alternates between 1 and 2 in successive frames, and the display process may then display decoded frames for 2 or 3 display frame periods, respectively.

Field Order

When PULLDOWN is signaled in the sequence header, the order in which to display the two fields of a frame on the target display is determined by the TFF flag in the picture header. If TFF=1, the decoded field spatially closer to the top of the display (i.e., the top field) is displayed for one display field period, followed by the decoded field spatially closer to the bottom of the display. If TFF=0, the decoded field spatially closer to the bottom of the display (i.e., the bottom field) is displayed for one display field period, followed by the decoded field spatially located closer to the top of the display.

If PULLDOWN is not signaled in the sequence header, decoded pictures are displayed as if TFF=1, but TFF is not explicitly sent in the bitstream.

Repeating Fields

When a sequence has an interlaced target display type (INTERLACE=1) and pull-down is used (PULLDOWN=1), picture headers contain the Boolean field RFF. When the RFF flag is set, the display process may display the first field of a field pair again after displaying the second field of the pair—thus extending the duration of the field-pair (frame) to three display field periods.

When a decoded frame is displayed for three display field periods, the subsequent decoded frame will be flagged with the opposite value of TFF (i.e. if the first decoded frame has TFF=1, the second decoded frame has TFF=0).

2. Pan/Scan Regions

The Pan/Scan region is a sub-region of the display region which can be used as an alternative presentation format. The most common application is to display a 4:3 sub-region of 16:9 content.

The Boolean PANSCAN_FLAG, when set, signals that Pan/Scan windows are present for pictures within an entry point segment. Pan/Scan information is not necessarily available throughout an entire sequence.

Pan/Scan regions are described with respect to the display region, not the coded picture size. Thus the geometric relationship between a display and the Pan/Scan information is not affected by changes in the coded picture size.

Pan/Scan Windows

A Pan/Scan window is a portion of video displayed on a screen as a result of a view selection. Pan/Scan window information is present in picture headers if the entry point header syntax element PANSCAN_FLAG is 1. In this case, each picture header in the entry point segment has the PS_PRESENT syntax element. If PS_PRESENT is 1 then for each window in the frame there are four syntax elements—PS_HOFFSET, PS_VOFFSET, PS_WIDTH and PS_HEIGHT—that define the size and location of the window within the frame.

If PS_PRESENT is 1 then there are from one to four Pan/Scan windows in each frame. The number of Pan/Scan windows is determined by the sequence header syntax elements INTERLACE and PULLDOWN and the frame header syntax elements RFF and RPTFRM. The pseudo-code 1700 in FIG. 17 illustrates how the number of Pan/Scan windows is determined.

If the sequence header INTERLACE is 1 then there is a Pan/Scan window (if they are present) for each displayed field in the frame. Therefore, there are either two (for the case where RFF=0) or three (for the case where RFF=1) windows. If the sequence header INTERLACE is 0, there is a Pan/Scan window (if they are present) for each displayed frame. Since RPTFRM indicates how many times the current frame is repeated for display, the number of Pan/Scan windows is 1+RPTFRM.

For each Pan/Scan window there is a set of four Pan/Scan window syntax elements in the frame header: PS_HOFFSET, PS_VOFFSET, PS_WIDTH and PS_HEIGHT. The order of the pan windows in the frame header bitstream is the same as the display order of the fields or frames—meaning that the first set of Pan/Scan window syntax elements corresponds to the first field or frame in display order.

Having described and illustrated the principles of our invention with reference to various embodiments, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. In a computing device that implements a video decoder, a method comprising:
   with the computing device that implements the video decoder, receiving and processing a first bitstream element in sequence layer in a bitstream for a video sequence;
   with the computing device that implements the video decoder, receiving and processing a second bitstream element in the sequence layer in the bitstream for the video sequence, wherein frame coding mode is variable between progressive, field-interlaced and frame-interlaced for individual frames within the video sequence, and where the first and second bitstream elements in the sequence layer indicate whether the bitstream includes (a) both the repeat-picture element and a field-order element per frame, (b) the repeat-picture element but not the field-order element per frame, or (c) neither the repeat-picture element nor the field-order element per frame;
   with the computing device that implements the video decoder, receiving and processing frame data in frame layer of the bitstream for frame in the video sequence, wherein the first bitstream element indicates whether the repeat-picture element is present or absent in the frame data in the frame layer of the bitstream, including:
      receiving and processing a frame coding mode element that indicates whether the frame coding mode for the frame is progressive, field-interlaced, or frame-interlaced;
      if the first bitstream element indicates the repeat-picture element is present in the frame data for the frame in the bitstream, then:
         if the second bitstream element has a first value, receiving the repeat-picture element for the frame but not the field-order element for the frame, wherein the repeat-picture element for the frame is a repeat-frame element;
         otherwise, the second bitstream element having a second value, receiving the repeat-picture element for the frame and the field-order element for the frame, wherein the repeat-picture element for the frame is a repeat-field element;
      otherwise, the first bitstream element indicating the repeat-picture element is absent from the frame data for the frame in the bitstream, skipping the receiving the repeat-picture element for the frame and the field-order element for the frame; and
   with the computing device that implements the video decoder, decoding the frame using the frame data.

2. The method of claim 1 wherein the first bitstream element is a pull-down flag.

3. The method of claim 1 wherein the frame coding mode is progressive for all frames in the video sequence.

4. The method of claim 3 wherein the frame is of a type selected from a group comprising: progressive I-frame, progressive P-frame, and progressive B-frame.

5. The method of claim 3 wherein the frame is a skipped frame.

6. The method of claim 3 wherein the repeat-frame element indicates a number of times the frame is to be displayed.

7. The method of claim 3 wherein a number of pan/scan windows for the frame is indicated at least in part by the repeat-frame element.

8. The method of claim 1 wherein the repeat-picture element is the repeat-field element associated with the frame.

9. The method of claim 8 wherein the repeat-field element is a repeat-first-field flag.

10. The method of claim 8 wherein the frame is of a type selected from a group comprising: interlaced I-frame, interlaced BI-frame, interlaced P-frame, interlaced B-frame, I/I-frame, I/P-frame, P/I-frame, P/P-frame, B/B frame, B/BI-frame, BI/B frame, BI/BI-frame.

11. The method of claim 8 wherein the frame is of a type selected from a group comprising: progressive I-frame, progressive P-frame, and progressive B-frame.

12. The method of claim 8 wherein the frame is a skipped frame.

13. The method of claim 8 wherein the field-order element is a top-field-first flag.

14. The method of claim 8 wherein a number of pan/scan windows for the frame is indicated at least in part by the repeat-field element.

15. A non-transitory storage medium having computer-executable instructions stored thereon for performing the method of claim 1 in a video decoder.

16. A computing device that implements a video decoder, a method comprising:
   with the computing device that implements the video decoder, receiving a pull-down flag at sequence level in a bitstream comprising plural syntax levels wherein the presence or absence of a repeat-picture element in the bitstream at frame level is indicated by the pull-down flag;
   with the computing device that implements the video decoder, receiving an interlaced content flag at the sequence level in the bitstream, wherein the interlaced content flag indicates whether all frames of the video sequence are progressive or frame coding mode is variable between progressive, frame-interlaced and field-interlaced for individual frames within the video sequence, and wherein bitstream syntax permits signaling in the bitstream of (a) both the repeat-picture element and a field-order element per frame, (b) the repeat-picture element but not the field-order element per frame, and (c) neither the repeat-picture element nor the field-order element per frame;
   with the computing device that implements the video decoder, receiving frame data for a frame at the frame level of the bitstream, including:
      if the interlaced content flag indicates the frame coding mode is variable for individual frames within the video sequence, receiving the processing a frame coding mode element having one of plural code values for the frame, wherein a first of the plural code values indicates the frame coding mode of the frame is progressive, wherein a second of the plural code values indicators the frame coding mode of the frame is frame-interlaced and wherein a third of the plural code values indicates the frame coding mode of the frame is field-interlaced;
      if the pull-down flag indicates the repeat-picture element is present in the frame data for the frame in the bitstream:
         if all frames of the video sequence are progressive, receiving the repeat-picture element for the frame but not the field-order element for the frame, wherein the repeat-picture element for the frame is multi-bit repeat-frame element, the repeat-frame element indicating a number of times the frame is to be displayed; and otherwise, the frame coding mode being variable for individual frames within the video sequence, receiving the repeat-picture element for the frame and the field-order element for the frame, wherein the repeat-picture element for the frame is a single-bit repeat-picture element different than the multi-bit repeat-frame element, the repeat-field element indicating whether or not to repeat a field of the frame;

otherwise, the pull-down flag indicating that the repeat-picture element is absent from the frame data for the frame in the bitstream, skipping receipt of the repeat-picture element and the field-order element for the frame; and with the computing device that implements the video decoder, decoding the frame using the frame data.

17. In a computing device that implements a video encoder, a method comprising with the computing device that implements the video encoder, representing a first encoding decision with a flag in a sequence layer in a bitstream for a video sequence, wherein the flag is a pull-down flag, wherein the first encoding decision indicates at least in part whether to include a repeat-picture element for each of one or more frames in the bitstream in frame layer;

with the computing device that implements the video encoder, representing a second encoding decision with an interlaced content flag in the sequence layer in the bitstream, wherein the second encoding decision indicates whether all frames of the video sequence are progressive or frame coding mode is variable between progressive, frame-interlaced and field-interlaced for individual frames within the video sequence, and wherein bitstream syntax permits signaling in the bitstream of (a) both the repeat-picture element and a field-order element per frame, (b) the repeat-picture element but not the field-order element per frame, and (c) neither the repeat-picture element nor the field-order element per frame; and for each of the one or more frames, with the computing device that implements the video encoder, encoding the frame and signaling encoded video information for the frame in the bitstream, including:

signaling a frame coding mode element having one of plural code values for the frame, wherein a first of the plural code values indicates the frame coding mode of the frame is progressive, wherein a second of the plural code values indicates the frame coding mode of the frame is frame-interlaced and wherein a third of the plural code values indicates the frame coding mode of the frame is field-interlaced;

if the first encoding decision is to include the repeat-picture element:

if all frames of the video sequence are progressive, signaling in the bitstream the repeat-picture element for the frame but not the field-order element for the frame, wherein the repeat-picture element is a multiple-bit repeat-frame element that indicates a number of times the frame is to be displayed;

otherwise, the frame coding mode being variable for individual frames within the video sequence, signaling in bitstream the repeat-picture element for the frame and the field-order element for the frame, wherein in the repeat-picture element is a single-bit repeat-field element, different than the repeat-frame element, that indicates whether or not to repeat a field of the frame, and otherwise, skipping the signaling of the repeat-picture element for the frame and the field-order element in the bitstream.

18. The method of claim 17 wherein the first encoding decision comprises a decision whether to enable picture display repetition for pull-down conversion.

19. The method of claim 17 wherein the repeat-picture element is the repeat-field flag.

20. The method of claim 16 wherein:

if all frames of the video sequence are progressive, the frame is of a type selected from a group comprising progressive I-frame, progressive P-frame, progressive B-frame, and skipped frame; and if the frame coding mode is variable for individual frames within the video sequence, the frame is of a type selected from a group comprising interlaced I-frame, interlaced BI-frame, interlaced P-frame, interlaced B-frame, I/I-frame, I/P-frame, P/I-frame, P/P-frame, B/B frame, B/BI-frame, BI-B frame, BI/BI-frame, progressive I-frame, progressive P-frame, progressive B-frame, and skipped frame.

21. The method of claim 17 wherein:

if all frames of the video sequence are progressive, the frame is of a type selected from a group comprising progressive I-frame, progressive P-frame, progressive B-frame, and skipped frame; and if the frame coding mode is variable for individual frames within the video sequence, the frame is of a type selected from a group comprising interlaced I-frame, interlaced BI-frame, interlaced P-frame, interlaced B-frame, I/I-frame, I/P-frame, P/I-frame, P/P-frame, B/B frame, B/BI-frame, BI-B frame, BI/BI-frame, progressive I-frame, progressive P-frame, progressive B-frame, and skipped frame.

22. The method of claim 1 wherein the repeat-frame element is a multiple-bit syntax element that indicates a number of times the frame is to be displayed, and wherein the repeat-field element is a single-bit syntax element that indicates whether or not to repeat a field of the frame.

* * * * *